US009990546B2

(12) United States Patent
Jin

(10) Patent No.: US 9,990,546 B2
(45) Date of Patent: Jun. 5, 2018

(54) METHOD AND APPARATUS FOR DETERMINING TARGET REGION IN VIDEO FRAME FOR TARGET ACQUISITION

(71) Applicant: Alibaba Group Holding Limited, Grand Cayman (KY)

(72) Inventor: Xuan Jin, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 178 days.

(21) Appl. No.: 15/015,072

(22) Filed: Feb. 3, 2016

(65) Prior Publication Data

US 2016/0224833 A1 Aug. 4, 2016

(30) Foreign Application Priority Data

Feb. 4, 2015 (CN) .......................... 2015 1 0059261

(51) Int. Cl.
*G06K 9/00* (2006.01)
*G06K 9/46* (2006.01)
*G06K 9/52* (2006.01)
*G06K 9/32* (2006.01)
*G06T 7/20* (2017.01)
*G06K 9/42* (2006.01)

(52) U.S. Cl.
CPC ....... *G06K 9/00744* (2013.01); *G06K 9/3233* (2013.01); *G06K 9/4619* (2013.01); *G06K 9/4652* (2013.01); *G06K 9/522* (2013.01); *G06T 7/20* (2013.01); *G06K 9/42* (2013.01)

(58) Field of Classification Search
None
See application file for complete search history.

(56) References Cited

U.S. PATENT DOCUMENTS

| 5,631,697 | A | 5/1997 | Nishimura et al. |
| 6,263,088 | B1* | 7/2001 | Crabtree ............... G01S 3/7865 348/169 |
| 6,574,353 | B1 | 6/2003 | Schoepflin et al. |
| 7,796,780 | B2 | 9/2010 | Lipton et al. |
| 8,477,998 | B1 | 7/2013 | Kim et al. |

(Continued)

FOREIGN PATENT DOCUMENTS

CN 103400129 11/2013

OTHER PUBLICATIONS

The PCT Search Report and Written Opinion dated Jun. 10, 2016 for PCT application No. PCT/US16/16462, 12 pages.

*Primary Examiner* — Tahmina Ansari
(74) *Attorney, Agent, or Firm* — Lee & Hayes, PLLC

(57) ABSTRACT

An example target acquisition method includes obtaining, according to a global feature of each video frame of a plurality of video frames, a target pre-estimated position of each scale in the video frame; clustering the target pre-estimated position in each video frame to obtain a corresponding target candidate region; and determining a target actual region in the video frame according to all the target candidate regions in each video frame in combination with confidence levels of the target candidate regions and corresponding scale processing. The techniques of the present disclosure quickly and effectively acquire one or multiple targets, and, more particularly, achieve accurately distinguishing and acquiring the multiple targets.

18 Claims, 18 Drawing Sheets

(56) References Cited

U.S. PATENT DOCUMENTS

| | | |
|---|---|---|
| 9,607,023 B1 * | 3/2017 | Swamy ............. G06F 17/30648 |
| 9,754,163 B2 * | 9/2017 | Segalovitz ......... G06K 9/00463 |
| 2002/0114394 A1 | 8/2002 | Ma |
| 2004/0140994 A1 | 7/2004 | Choi et al. |
| 2007/0092110 A1 | 4/2007 | Xu et al. |
| 2008/0260234 A1 * | 10/2008 | Yamashita ....... G01N 21/95607 |
| | | 382/144 |
| 2010/0067741 A1 | 3/2010 | Stolkin et al. |
| 2012/0219185 A1 | 8/2012 | Hu et al. |
| 2013/0089301 A1 * | 4/2013 | Ju ........................... H04N 5/91 |
| | | 386/241 |
| 2014/0328543 A1 | 11/2014 | Iwamoto et al. |
| 2016/0048741 A1 * | 2/2016 | Nguyen ............... G06K 9/6256 |
| | | 382/159 |
| 2016/0224833 A1 * | 8/2016 | Jin .................... G06K 9/00744 |
| 2017/0083762 A1 * | 3/2017 | Segalovitz ......... G06K 9/00442 |

\* cited by examiner

OBTAIN TARGET PRE-ESTIMATED POSITIONS OF MULTIPLE SCALES IN EACH VIDEO FRAME OF PLURALITY OF VIDEO FRAMES ACCORDING TO GLOBAL FEATURE OF EACH VIDEO FRAME
S1

CLUSTER TARGET PRE-ESTIMATED POSITIONS IN EACH VIDEO FRAME TO OBTAIN CORRESPONDING TARGET CANDIDATE REGION
S2

DETERMINE TARGET ACTUAL REGION IN VIDEO FRAME ACCORDING TO ALL TARGET CANDIDATE REGIONS IN EACH VIDEO FRAME IN COMBINATION WITH CONFIDENCE LEVELS OF TARGET CANDIDATE REGIONS AND CORRESPONDING SCALE PROCESSING
S3

FIG. 1

METHOD AND APPARATUS FOR DETERMINING TARGET REGION IN VIDEO FRAME FOR TARGET ACQUISITION

CROSS-REFERENCE TO RELATED PATENT APPLICATION

This application claims foreign priority to Chinese Patent Application No. 201510059261.5 filed on 4 Feb. 2015, entitled "Method and Apparatus for Target Acquisition", which is hereby incorporated by reference in its entirety.

TECHNICAL FIELD

The present disclosure relates to the field of communications and computers, and, more particularly, to a target acquisition method and apparatus.

BACKGROUND

Along with the arrival of the 4G era, information delivery methods of mobile terminals are not only limited to texts and images, but more generally come from video. Many internet companies have also launched related application interfaces, and the techniques for acquiring the video information has become one of the latest research hotspots.

The existing multi-target tracking techniques are mostly applied to the radar and aviation fields, including a space tracking method and a time-space tracking method. The space tracking method includes processing each frame of an image signal individually, and tracking a moving target by using a feature of target signal in a two-dimensional space. The time-space tracking method involves utilizing the feature of the target in a space domain and a motion feature thereof in a time domain, which is divided into contrast tracking and image-related tracking. Other techniques include a method based on a particle filter, a method based on mean shift, and the like.

The existing multiple-target tracking techniques usually have a single applicable scenario, and a single tracking target type. The reason is because on the one hand, the existing multi-class classifier has a low classification precision and a complex classification algorithm such as a deep neural networks (DNN) cannot be used in consideration of the operation efficiency; and on the other hand, the multiple-target tracking needs to not only deal with distinguishing between the target and the background, but also distinguishing between the targets.

With respect to the target tracking algorithm, with respect to a simple single target, the existing OpenTLD achieves a stable effect and its source code is opened; however, it is only directed to the single target. The existing solution (which establishes a universal multi-class target model through DNN, performs the multiple-target detection upon the start of the first frame of the video, gives the position of each target, and then utilizes the conventional target tracking method to implement the tracking) consumes a large amount of calculation during the multiple-target detection, and needs to train a tremendous model off line, which leads to a huge consumption in calculation and storage, and hardly meets the requirement of real-time application in the video.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The objective of the present disclosure is to provide a target acquisition method and apparatus, which solves the problem of how to accurately distinguish and acquire multiple targets.

In view of the above, the present disclosure provides a target acquisition method, which includes:

obtaining, according to a global feature of each video frame, target pre-estimated positions of multiple scales in each video frame of a plurality of video frames;

clustering the target pre-estimated positions in each video frame to obtain a corresponding target candidate region; and determining a target actual region in the video frame according to all the target candidate regions in each video frame in combination with confidence levels of the target candidate regions and corresponding scale processing.

Further, after determining a target actual region in the video frame according to all the target candidate regions in each video frame in combination with confidence levels of the target candidate regions and corresponding scale processing, the method further includes:

comparing the same target actual regions in the video frames at two adjacent time points to determine whether the target actual regions in the video frames are invalid.

Further, before obtaining, according to a global feature of each video frame, a target pre-estimated position of each scale in the video frame, the method further includes:

performing size normalization on each video frame.

Further, the global feature includes one or more of the following features including a global grayscale feature, a global texture feature, a global color feature, and a global motion feature.

Further, the global grayscale feature of each video frame is obtained based on an average value of a sum of three color channels of the video frame.

Further, the global texture feature of each video frame is extracted by using an edge detection algorithm of Gabor matrix or Canny operator.

Further, extracting the global color feature of each video frame includes:

obtaining modified basis matrices of four colors including red, green, blue, and yellow according to the three color channels of each video frame;

obtaining a red-green color feature matrix and a blue-yellow color feature matrix according to the basis matrices of four colors including red, green, blue, and yellow; and using an absolute value of a difference between the red-green color feature matrix and the blue-yellow color feature matrix as the global color feature of the video frame.

Further, extracting the global motion feature of each video frame includes:

using an absolute value of a difference between the grayscale feature map of each video frame and the grayscale feature map of the corresponding previous video frame as the global motion feature of the video frame.

Further, obtaining, according to a global feature of each video frame, a target pre-estimated position of each scale in the video frame includes:

weighting the global feature of each video frame and performing multi-scale frequency domain amplitude spectrum filtering to obtain the target pre-estimated position of each scale in the video frame.

Further, weighting the global feature of each video frame and performing multi-scale frequency domain amplitude spectrum filtering to obtain the target pre-estimated position of each scale in the video frame includes:

weighting the global feature of each video frame to obtain a matrix polynomial;

performing a polynomial Fourier transformation on the matrix polynomial to obtain a frequency domain polynomial matrix;

performing the multi-scale amplitude spectrum filtering on the frequency domain polynomial matrix to obtain the frequency domain of each scale; and performing an inverse Fourier transformation on the frequency domain of each scale to obtain the target pre-estimated position of each scale in the video frame.

Further, performing the multi-scale amplitude spectrum filtering on the frequency domain polynomial matrix to obtain the frequency domain of each scale includes:

obtaining a corresponding amplitude spectrum according to the frequency domain polynomial matrix;

performing preset multi-scale amplitude spectrum filtering on the amplitude spectrum by using a Gaussian low-pass filter to obtain a filtered amplitude spectrum of each scale; and obtaining a filtered frequency domain of each scale according to a phase spectrum and the filtered amplitude spectrum of each scale.

Further, clustering the target pre-estimated position in each video frame to obtain a corresponding target candidate region includes:

obtaining a corresponding target candidate region according to each target pre-estimated position of each scale in each video frame;

determining whether the number of pixels in each target candidate region is less than a preset number, and if yes, filtering the target candidate region out; and making a histogram for each target candidate region that is not filtered out, and calculating an information entropy of each target candidate region, by using the histogram, as a confidence level of the corresponding target candidate region.

Further, obtaining a corresponding target candidate region according to each target pre-estimated position of each scale in each video frame includes:

sequentially using each target pre-estimated position of each scale in each video frame as a current target pre-estimated position of a current scale in a current video frame, and sequentially performing the following processing on the current target pre-estimated position of the current scale in the current video frame:

labeling the pixel in the current target pre-estimated position of the current scale in the current video frame as unvisited;

scanning the current target pre-estimated position of the current scale, finding a pixel labeled as unvisited and having a pixel value greater than a preset value in the current target pre-estimated position as a central pixel, and labeling the central pixel as visited;

acquiring other pixels labeled as unvisited and having a pixel value greater than a preset value in a neighboring domain of the central pixel, and labeling the acquired other pixels labeled as unvisited and having a pixel value greater than a preset value as visited; and initializing a target candidate region corresponding to the current target pre-estimated position, and adding the central pixel and other pixels labeled as unvisited and having a pixel value greater than a preset value in the neighboring domain to the target candidate region.

Further, determining the target actual region in the video frame according to all the target candidate regions in each video frame in combination with confidence levels of the target candidate regions and corresponding scale processing includes performing the following processing on each video frame:

establishing a regional tree structure for the target candidate regions of all scales in each video frame in a sequence from large to small scales; and obtaining the target actual region in each video frame according to the regional tree structure of each video frame and the confidence levels of all the target candidate regions.

Further, obtaining the target actual region in each video frame according to the regional tree structure of each video frame and the confidence levels of all the target candidate regions includes traversing each node region of the regional tree structure of each video frame in a sequence from large to small scales, and implementing iteration in accordance with the following situations to obtain the target actual region in each video frame:

if currently the parent node region and the child node region are single-child trees, directly selecting the node region having a higher confidence level as the target actual region and terminating the iteration;

if currently the parent node region and the child node region are multi-child trees, and the confidence level of the current parent node region is higher than the confidence levels of both the two child node regions, selecting the parent node region as the target actual region and terminating the iteration;

if currently the parent node region and the child node region are multi-child trees, and the confidence levels of the current two child node region are both higher than the confidence level of the current parent node region, selecting the two child node regions as the target actual regions; and if currently the parent node region and the child node region are multi-child trees, and the confidence level of the parent node region is higher than the confidence level of one of the two child node regions and is lower than the confidence level of the other one of the two child node regions, selecting the child node region having the higher confidence level as the target actual region.

Another aspect of the present disclosure provides a target acquisition apparatus, which includes:

a first device that obtains, according to a global feature of each video frame, target pre-estimated positions of multiple scale in each video frame of a plurality of video frames;

a second device that clusters the target pre-estimated positions in each video frame to obtain a corresponding target candidate region; and a third device that determines a target actual region in the video frame according to all the target candidate regions in each video frame in combination with confidence levels of the target candidate regions and corresponding scale processing.

Further, the apparatus further includes:

a fourth device that compares the same target actual regions in the video frames at two adjacent time points to determine whether the target actual regions in the video frames are invalid.

Further, the apparatus includes:

a fifth device that performs size normalization on each video frame.

Further, all the global features of each video frame include one or more of the following features including a global grayscale feature, a global texture feature, a global color feature, and a global motion feature.

Further, the global grayscale feature of each video frame is obtained based on an average value of a sum of three color channels of the video frame.

Further, the global texture feature of each video frame is extracted by using an edge detection algorithm of Gabor matrix or Canny operator.

Further, extracting the global color feature of each video frame includes:

obtaining modified basis matrices of four colors including red, green, blue, and yellow according to the three color channels of each video frame;

obtaining a red-green color feature matrix and a blue-yellow color feature matrix according to the basis matrices of four colors including red, green, blue, and yellow; and using an absolute value of a difference between the red-green color feature matrix and the blue-yellow color feature matrix as the global color feature of the video frame.

Further, extracting the global motion feature of each video frame includes:

using an absolute value of a difference between the grayscale feature map of each video frame and the grayscale feature map of the video frame previous to the preset frame as the global motion feature of the video frame.

Further, the first device weights the global feature of each video frame and performs multi-scale frequency domain amplitude spectrum filtering, to obtain the target pre-estimated position of each scale in the video frame.

Further, the first device includes:

a first-first unit that weights the global feature of each video frame to obtain a matrix polynomial;

a first-second unit that performs a polynomial Fourier transformation on the matrix polynomial to obtain a frequency domain polynomial matrix;

a first-third unit that performs the multi-scale amplitude spectrum filtering on the frequency domain polynomial matrix to obtain the frequency domain of each scale; and a first-fourth unit that performs an inverse Fourier transformation on the frequency domain of each scale to obtain the target pre-estimated position of each scale in the video frame.

Further, the first-third unit includes:

a first-third-first unit that obtains a corresponding amplitude spectrum according to the frequency domain polynomial matrix;

a first-third-second unit that performs preset multi-scale amplitude spectrum filtering on the amplitude spectrum by using a Gaussian low-pass filter to obtain a filtered amplitude spectrum of each scale; and a first-third-third unit that obtains a filtered frequency domain of each scale according to a phase spectrum and the filtered amplitude spectrum of each scale.

Further, the second device includes:

a second-first unit that obtains a corresponding target candidate region according to each target pre-estimated position of each scale in each video frame;

a second-second unit that determines whether the number of pixels in each target candidate region is less than a preset number, and if a result is positive, filters the target candidate region out; and a second-third unit that makes a histogram, with respect to the target candidate region, for each target candidate region that is not filtered out, and calculates information entropy of each target candidate region, by using the histogram, as a confidence level of the corresponding target candidate region.

Further, the second-first unit sequentially uses each target pre-estimated position of each scale in each video frame as a current target pre-estimated position of a current scale in a current video frame, and sequentially performs the following processing on the current target pre-estimated position of the current scale in the current video frame:

labeling the pixel in the current target pre-estimated position of a current scale in a current video frame as unvisited;

scanning the current target pre-estimated position of the current scale, finding a pixel labeled as unvisited and having a pixel value greater than a preset value in the current target pre-estimated position as a central pixel, and labeling the central pixel as visited;

acquiring other pixels labeled as unvisited and having a pixel value greater than a preset value in a neighboring domain of the central pixel, and labeling the acquired other pixels labeled as unvisited and having a pixel value greater than a preset value as visited;

initializing a target candidate region corresponding to the current target pre-estimated position, and adding the central pixel and other pixels labeled as unvisited and having a pixel value greater than a preset value in the neighboring domain to the target candidate region.

Further, the third device includes:

a third-first unit that establishes a regional tree structure for the target candidate regions of all scales in each video frame in a sequence from large to small scales; and a third-second unit that obtains the target actual region in each video frame according to the regional tree structure of each video frame and the confidence levels of all the target candidate regions.

Further, the third-second unit traverses each node region of the regional tree structure of each video frame in a sequence from large to small scales, and implements iteration in accordance with the following situations to obtain the target actual region in each video frame:

if currently the parent node region and the child node region are single-child trees, directly selecting the node region having a higher confidence level as the target actual region and terminating the iteration;

if currently the parent node region and the child node region are multi-child trees, and the confidence level of the current parent node region is higher than the confidence levels of both the two child node regions, selecting the parent node region as the target actual region and terminating the iteration;

if currently the parent node region and the child node region are multi-child trees, and the confidence levels of the current two child node region are both higher than the confidence level of the current parent node region, selecting the two child node regions as the target actual regions; and if currently the parent node region and the child node region are multi-child trees, and the confidence level of the parent node region is higher than the confidence level of one of the two child node regions and is lower than the confidence level of the other one of the two child node regions, selecting the child node region having the higher confidence level as the target actual region.

Compared with the conventional techniques, the techniques of the present disclosure obtain, according to a global feature of each video frame, a target pre-estimated position of each scale in the video frame, cluster the target pre-estimated position in each video frame to obtain a corresponding target candidate region, and determine a target actual region in the video frame according to all the target candidate regions in each video frame in combination with confidence levels of the target candidate regions and corresponding scale processing. The techniques of the present disclosure quickly and effectively acquire one or multiple targets, and in particular, are capable of accurately distinguishing and acquiring the multiple targets.

Further, the techniques of the present disclosure calculate whether the distance between the central positions of the same target actual regions in the video frames at two adjacent time points is greater than or equal to a preset threshold, and if a result is positive, it is determined that the target actual region in the video frame at the latter one of the two adjacent time points is invalid, thereby achieving a higher precision in the subsequent extracting of the targets in the video, and providing basic features for video classification and the like.

BRIEF DESCRIPTION OF THE DRAWINGS

By providing the detailed description of the non-restrictive example embodiments made with reference to the accompanied drawings, the features, objectives, and advantages of the present disclosure are illustrated.

FIG. 1 is a flow chart of an example target acquisition method according to one aspect of the present disclosure;

The same or similar reference numerals in the accompanying drawings represent the same or similar components.

DETAILED DESCRIPTION

Figure 2:
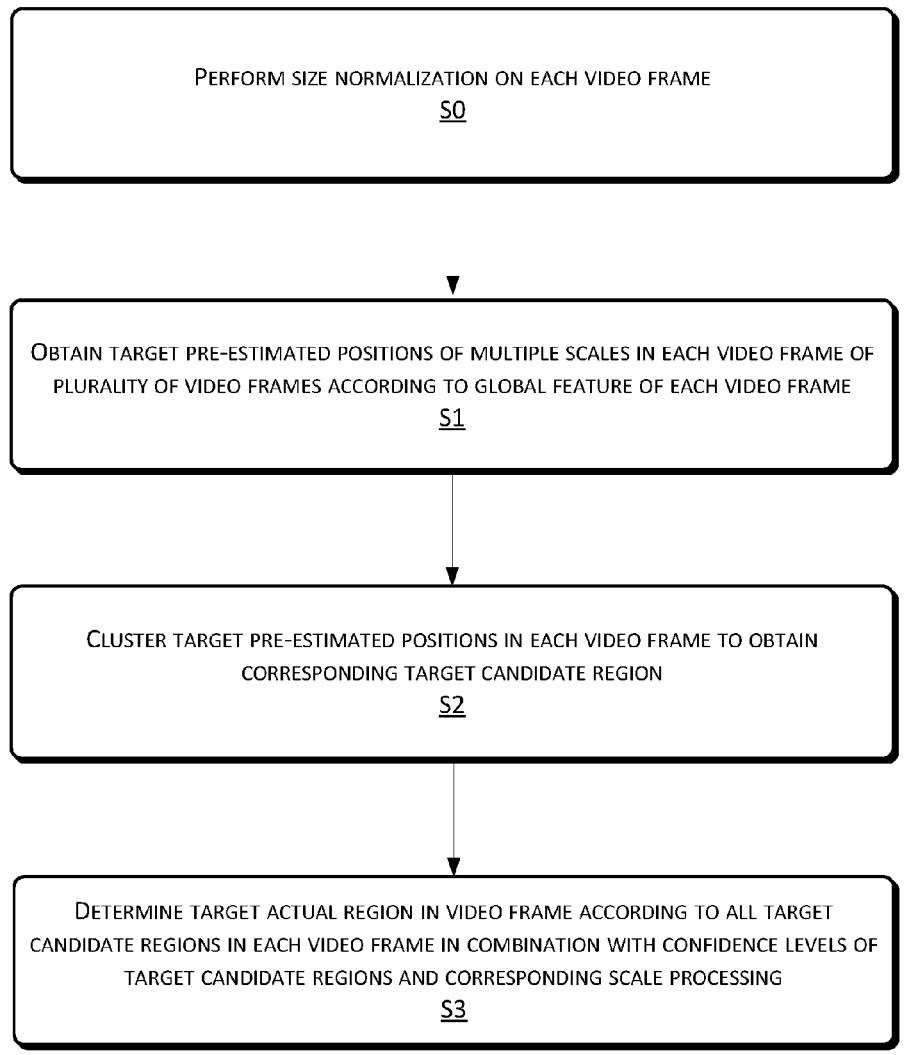
FIG. 2 is a flow chart of an example acquisition method according to an example embodiment of the present disclosure.

In a typical configuration of the present disclosure, a terminal, a device for serving network, and a credible party all include one or more processors (CPU), an input/output interface, a network interface, and a memory.

The memory may include various types of computer readable media such as a volatile memory, a random access memory (RAM) and/or a non-volatile memory, for example, a read-only memory (ROM) or a flash RAM. The memory is an example of computer readable medium.

The computer readable medium includes non-volatile and volatile media as well as movable and non-movable media, and can implement information storage by using any method or technology. Information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of random access memory (RAM), a read only memory (ROM), an electrically erasable programmable read-only memory (EEPROM), a flash memory or other memory technologies, a compact disk read only memory (CD-ROM), a digital versatile disc (DVD) or other optical storages, a cassette tape, a magnetic tape/magnetic disk storage or other magnetic storage devices, or any other non-transmission medium, and can be used to store information accessed by the computing device. According to the definition of this text, the computer readable medium does not include transitory media, such as a modulated data signal and a carrier.

FIG. 1 is a flow chart of an example target acquisition method according to one aspect of the present disclosure. With reference to FIG. 1, the present disclosure proposes a target acquisition method, which includes:

At S1, according to a global feature of each video frame, target pre-estimated positions of multiple scales in each video frame is obtained. In order to realize automatically selecting a target, the method of a feature training model and a classifier cannot be used to implement the detection on the target. Instead of the conventional multiple-target tracking method, the present disclosure uses detection of significance degree to implement the pre-estimation of the target position, in which each video frame is extracted from the same video, and the target pre-estimated position in the video frame is a significance map, for example, a probability map.

At S2, the target pre-estimated positions in each video frame is clustered to obtain a corresponding target candidate region.

At S3, a target actual region in the video frame is determined according to all the target candidate regions in each video frame in combination with confidence levels of the target candidate regions and corresponding scale processing. Herein, one or more target actual regions may be obtained, so as to realize quickly and effectively acquire one or multiple targets, and in particular, to be capable of accurately distinguishing and acquiring the multiple targets.

FIG. 2 is a flow chart of an example target acquisition method according to an example embodiment of the present disclosure. With reference to FIG. 2, before S1 in FIG. 1, the following is further included.

At S0, the size normalization is performed on each video frame such as zooming in and out for each video frame. In the process of zooming in and out for each video frame, methods such as bilinear interpolation, linear interpolation, or cubic interpolation may be used for interpolating the missing pixel value. For example, each video frame may be converted into 64×64 pixels. Correspondingly, at S1, the global feature of each video frame is obtained according to the normalized video frame. Those skilled in the art could understand that the above description of performing the size normalization on the video frame is merely an example, and other existing or future possible normalization which is applicable to the present disclosure should also be covered within the scope of protection of the present disclosure and included herein by reference.

Figure 3:
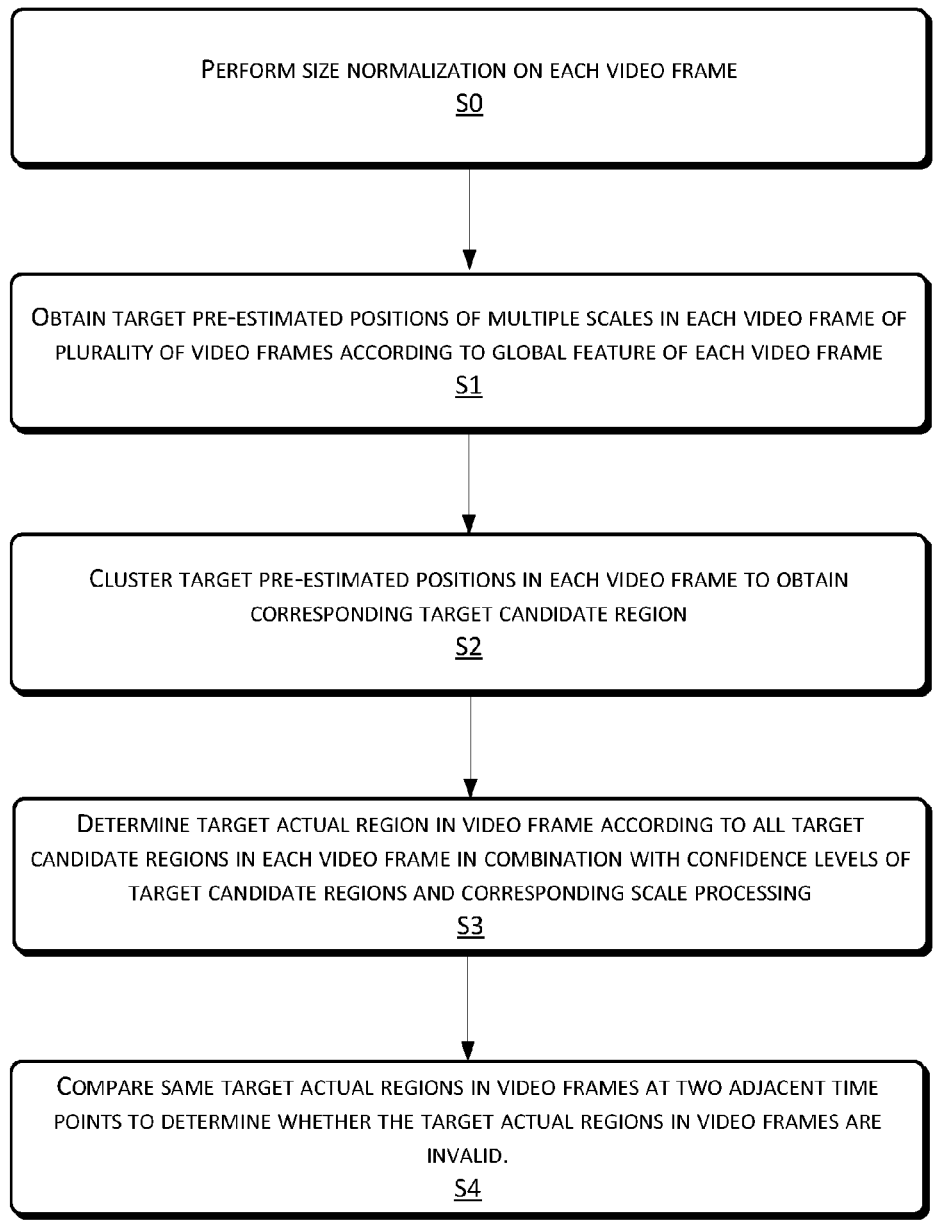
FIG. 3 is a flow chart of an example target acquisition method according to another example embodiment of the present disclosure.

FIG. 3 is a flow chart of the target acquisition method according to an example embodiment of the present disclosure. With reference to FIG. 3, after S3 in FIG. 1, the following operations are performed.

At S4, the same target actual regions in the video frames at two adjacent time points are compared, to determine whether the target actual regions in the video frames are invalid. For example, whether the distance between the central positions of the same target actual regions in the video frames at two adjacent time points is greater than or equal to a preset threshold is calculated, and if a result is positive, it is determined that the target actual region in the video frame at the latter one of the two adjacent time points is invalid. In addition, a slope from the target actual region at the time point t−1 to the same target actual region at the time point t, and a slope from the target actual region at the time point t to the target actual region at the time point t+1 are further calculated. Whether the difference between the former and the latter slopes is higher than a preset threshold is determined, and if a result is yes, it means that they are not in the same track, i.e., it is determined that the target actual region at the time point t+1 is invalid. Herein, whether the tracking process is valid is determined by using the motion continuity of the moving target, so as to determine whether the tracked target is occluded or out of the scenario, which facilitates achieving a higher precision in the subsequent extracting of the targets in the video, and provides basic features for video classification or the like. Those skilled in the art could understand that the above description of determining whether the target actual region is invalid is merely an example, and other existing or future possible description of determining whether the target actual region is invalid, which is applicable to the present disclosure, should also be covered within the scope of protection of the present disclosure and included herein by reference.

In an example embodiment of the present disclosure, the distance between the same target actual regions in the video frames at the two adjacent time points at S4 is obtained from the following equation:

$|c_{region}(t,\text{region})-c_{region}(t+1,\text{region})|,$ wherein, the region represents a certain target actual region, the function c represents a central location of the target actual region, |·| represents an Euclidean distance between the same target actual regions at adjacent time points, t and t+1 represent two adjacent time points, and if the Euclidean distance is greater than or equal to a given threshold, it is determined that the tracked target disappears or leaves field of view at the time point t+1. The threshold may be set correspondingly according to the normalized pixel at S0. In one example embodiment, if each video frame has been entirely converted into 64×64 pixels at S0, the corresponding given threshold value may be 4. Those skilled in the art could understand that the above description of calculating the distance between the same target actual regions is merely an example, and other existing or future possible description of calculating the distance between the same target actual regions, which is applicable to the present disclosure, should also be covered within the scope of protection of the present disclosure and included herein by reference.

In the target acquisition method according to an example embodiment of the present disclosure, the global feature includes one or more of a global grayscale feature, a global texture feature, a global color feature, and a global motion feature.

In the target acquisition method according to an example embodiment of the present disclosure, the global grayscale feature of each video frame is obtained based on an average value of a sum of three color channels of the video frame, and may be obtained from the following equation:

$I=\frac{1}{3}(r+g+b),$ wherein I represents the global grayscale feature of the video frame, r represents a red pixel channel of the video frame, g represents a green pixel channel of the video frame, and b represents a blue pixel channel of the video frame. Those skilled in the art could understand that the above description of acquiring the global grayscale feature is merely an example, and other existing or future possible description of acquiring the global grayscale feature, which is applicable to the present disclosure, should also be covered within the scope of protection of the present disclosure and included herein by reference.

In the target acquisition method according to an example embodiment the present disclosure, the global texture feature of each video frame is extracted by using an edge detection algorithm of Gabor matrix (filter) or Canny operator.

In an example embodiment the present disclosure, extracting the global texture feature of each video frame by using Gabor matrix (filter) includes:

using a maximum value based on position for the Gabor matrix $G_\theta$ generated in a preset number of directions of each video frame as the global texture feature O of each video frame, which may be described by using an equation as follows: $O=\max_{pixel}\{G_\theta\}$. For example, the Gabor matrix is a two-dimensional Gabor matrix G having a size of 11×11 pixels block, which is described as follows:

$$G_\theta(x, y) = \exp\left(-\frac{(X^2 + \gamma^2 Y^2)}{2\sigma^2}\right)\cos\left(\frac{2\pi}{\lambda}X\right),$$

in the equation, θ is the preset number of directions, θ={0°, 45°, 90°, 135°}, $G_\theta$ represents a two-dimensional Gabor matrix in a certain direction, X and Y represent a coordinate transformation after joining of the direction (an angle parameter) θ, X=x cos θ−y sin θ, Y=x sin θ+y cos θ, x represents a row coordinate of the pixel in each video frame, y represents a column coordinate of the pixel in each video frame, x,y∈{−5, . . . , 5}, γ represent a scaling factor, σ represents an effective width, λ represents a wavelength, the values of three constants including the scaling factor, the effective width, and the wavelength are experience values. For example, the value of the scaling factor γ in one embodiment is 0.3, the value of the effective width is 4.5, and the value of the wavelength λ is 5.6. If the θ has four directions of 0°, 45°, 90°, 135°, a maximum value is obtained based on position with respect to the Gabor matrix $G_θ$ generated in four directions of each video frame to obtain the global texture feature O of the video frame. Those skilled in the art could understand that the above description of acquiring the global texture feature is merely an example, and other existing or future possible description of acquiring the global texture feature, which is applicable to the present disclosure, should also be covered within the scope of protection of the present disclosure and included herein by reference.

In the target acquisition method according to an example embodiment the present disclosure, extracting the global color feature of each video frame includes:

obtaining modified basis matrices R, G, B, and Y of four colors including red, green, blue, and yellow according to three color channels of each video frame; wherein, the modified matrices R, G, B, and Y of four colors are established based on the sensitivity of the human eye to different colors, and the equation is specifically described as follows:

$$R = r - \frac{(g+b)}{2}$$
$$G = g - \frac{(r+b)}{2}$$
$$B = b - \frac{(r+g)}{2}$$
$$Y = \frac{(r+g)}{2} - \frac{|r-g|}{2} - b;$$

obtaining a red-green color feature matrix RG and a blue-yellow color feature matrix BY according to the basis matrices R, G, B, and Y of four colors including red, green, blue, and yellow, in which RG=R−G and BY=B−Y; and using an absolute value |RG−BY| a difference between the red-green color feature matrix and the blue-yellow color feature matrix as the global color feature of the video frame. Those skilled in the art could understand that the above description of acquiring the global color feature is merely an example, and other existing or future possible description of acquiring the global color feature, which is applicable to the present disclosure, should also be covered within the scope of protection of the present disclosure and included herein by reference.

In the target acquisition method according to an example embodiment the present disclosure, extracting the global motion feature of each video frame includes:

using an absolute value of a difference between the grayscale feature map of each video frame and the grayscale feature map of the corresponding previous video frame as the global motion feature of the video frame. Herein, the equation of the global motion feature M(t) of the video frame is described as follows:

$$M(t)=|I(t)-I(t-\tau)|,$$

wherein, M(t) represents the global motion feature of the video frame, the time point of the video frame is the time point t, I(t) represents the grayscale feature map of the video frame, I(t−τ) represents the grayscale feature map of the video frame previous to the preset frame, the time point of the video frame previous to the preset z frame is t−τ. The τ is a motion frame change amount, I(t) represents the motion amount at the time point t after a change of τ frames, the value of the τ may be determined according to the number of video frames per second in the video stream, the greater the number of the video frames per second is, the higher the value of τ is. For example, the value of τ in one example embodiment may be from 1 to 5, and the value of τ in an example embodiment may be 3.

I(t) and I(t−τ) are obtained according to the equation I=⅓(r+g+b)

wherein, I represents the global grayscale feature of the video frame, r represents a red pixel channel of the video frame, g represents a green pixel channel of the video frame, and b represents a blue pixel channel of the video frame. Those skilled in the art could understand that the above description of acquiring the global motion feature is merely an example, and other existing or future possible description of acquiring the global motion feature, which is applicable to the present disclosure, should also be covered within the scope of protection of the present disclosure and included herein by reference.

In the target acquisition method according to an example embodiment of the present disclosure, operations at S1 further include:

weighting the global feature of each video frame and performing multi-scale frequency domain amplitude spectrum filtering, to obtain the target pre-estimated position of each scale in the video frame.

Figure 4:
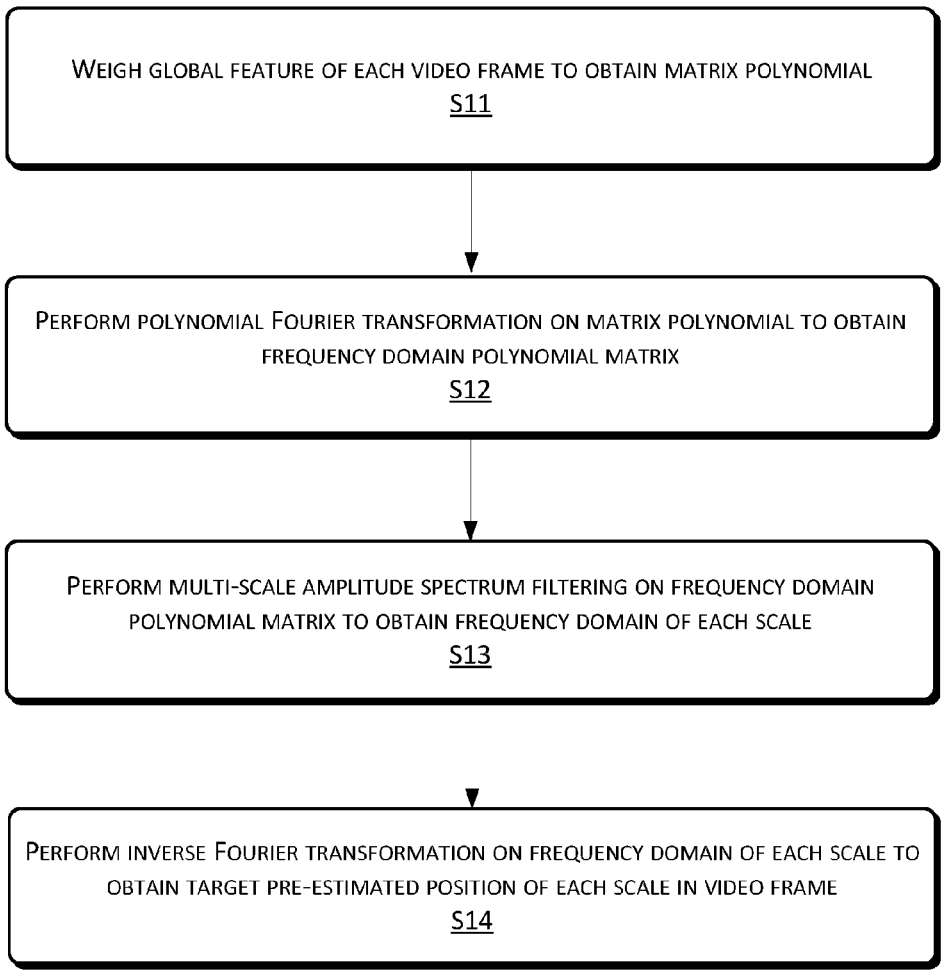
FIG. 4 is a flow chart of an example target acquisition method according to yet another example embodiment of the present disclosure.

FIG. 4 is a flow chart of the target acquisition method according to an example embodiment of the present disclosure. With reference to FIG. 4, weighting the global feature of each video frame and performing multi-scale frequency domain amplitude spectrum filtering, to obtain the target pre-estimated position of each scale in the video frame includes:

At S11, the global feature of each video frame is weighted to obtain a matrix polynomial; if the global grayscale feature, the global texture feature, the global color feature, and the global motion feature of each video frame are extracted, the matrix polynomial is specifically described as follows:

$$f(n,m)=|RG-BY|+I\vec{i}+O\vec{j}+M(t)\vec{k}$$

n,m represent discrete row and column coordinates respectively, and i, j, and k represent base vectors of the matrix polynomial;

At S12, the polynomial Fourier transformation is performed on the matrix polynomial to obtain a frequency domain polynomial matrix; wherein, the frequency domain polynomial matrix is described as follows:

$$F[u,v] = \frac{1}{\sqrt{MN}} \sum_{m=0}^{M-1}\sum_{n=0}^{N-1} e^{-\mu 2\pi(({mv \over M})+({nu \over N}))} f(n,m),$$

in the equation, u and v represent two dimensional coordinates of the frequency domain, M and N represent length and width of the video frame, and μ represents an imaginary unit, namely $μ^2=−1$;

At S13, multi-scale amplitude spectrum filtering is performed on the frequency domain polynomial matrix to obtain the frequency domain of each scale.

At S14, the inverse Fourier transformation is performed on the frequency domain of each scale to obtain the target pre-estimated position of each scale in the video frame. Herein, the target pre-estimated position $\tilde{f}(n,m)$ is obtained based on the following equation:

$$\tilde{f}(n, m) = \frac{1}{\sqrt{MN}} \sum_{v=0}^{M-1} \sum_{u=0}^{N-1} e^{\mu 2\pi\left(\left(\frac{mv}{M}\right)+\left(\frac{nu}{N}\right)\right)} \tilde{F}_H[u, v].$$

Those skilled in the art could understand that the above description of acquiring the target pre-estimated position is merely an example, and other existing or future possible description of acquiring the target pre-estimated position, which is applicable to the present disclosure, should also be covered within the scope of protection of the present disclosure and included herein by reference.

Figure 5:
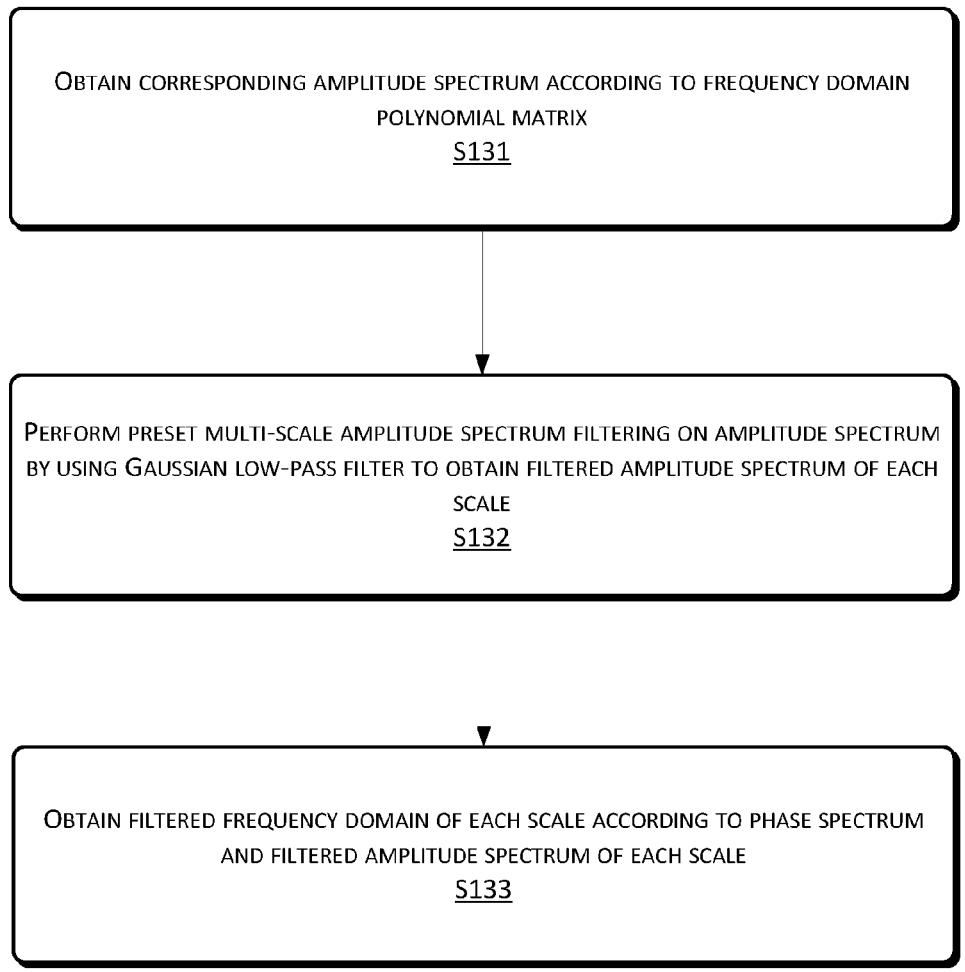
FIG. 5 is a flow chart of an example target acquisition method according to yet another example embodiment of the present disclosure.

FIG. 5 is a flow chart of the target acquisition method according to an example embodiment of the present disclosure. With reference to FIG. 5, the operations at S13 in FIG. 4 include:

At S131, a corresponding amplitude spectrum A is obtained according to the frequency domain polynomial matrix; herein, the amplitude spectrum of the frequency domain polynomial matrix is represented as follows:

$$A = |F|;$$

At S132, the preset multi-scale amplitude spectrum filtering is performed on the amplitude spectrum by using a Gaussian low-pass filter to obtain a filtered amplitude spectrum of each scale, and the Gaussian low-pass filter has the following form:

$$H(u, v) = e^{-\frac{D^2(u,v)}{2\sigma^2}},$$

in the equation, H is the Gaussian low-pass filter matrix, D represents a distance from the origin of the Fourier transformation, the distance may use an Euclidean distance, σ indicates that an extension degree of a Gaussian curve, namely the scale, which, for example, may be described as follows:

$\sigma \in \{2^{-1}, 2^0, 2^1, 2^2, 2^3, 2^4, 2^5, 2^6\}$; wherein, a plurality of scales is used to adapt to the acquisition of targets of different sizes;

the filtered amplitude spectrum of each scale is obtained according to the following equation:

$$A_H = A \times H$$

in the equation, $A_H$ represents the filtered amplitude spectrum of each scale.

At S133, a filtered frequency domain of each scale is obtained according to a phase spectrum and the filtered amplitude spectrum of each scale, wherein the filtered frequency domain $\tilde{F}_H$ of each scale is represented as follows:

$$\tilde{F}_H = A_H \times P_H,$$

wherein, the $P_H$ represents the phase spectrum. Those skilled in the art could understand that the above description of acquiring the frequency domain is merely an example, and other existing or future possible description of acquiring the frequency domain, which is applicable to the present disclosure, should also be covered within the scope of protection of the present disclosure and included herein by reference.

Figure 6:
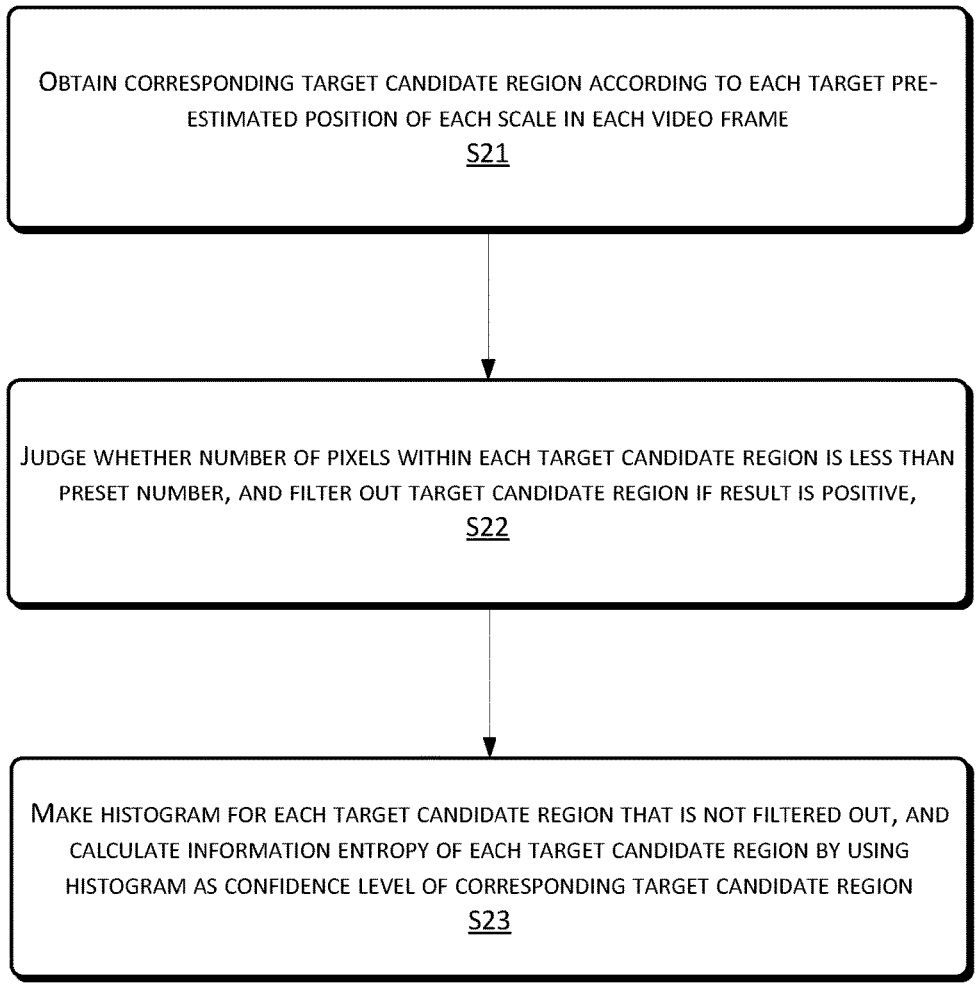
FIG. 6 is a flow chart of an example target acquisition method according to yet another example embodiment of the present disclosure.

FIG. 6 is a flow chart of the target acquisition method according to an example embodiment of the present disclosure. With reference to FIG. 6, the operations of S2 in FIG. 1 include:

At S21, a corresponding target candidate region is obtained according to each target pre-estimated position of each scale in each video frame.

At S22, whether the number of pixels within each target candidate region is less than a preset number is determined, and if a result is positive, the target candidate region is filtered out. For example, the target candidate region having a number of pixels less than 10 is filtered out, and flag=0 is configured, i.e., the confidence level is no longer calculated for the region subsequently.

At S23, a histogram is made for each target candidate region that is not filtered out, and information entropy of each target candidate region is calculated by using the histogram as a confidence level of the corresponding target candidate region. Herein, the confidence level can be obtained according to the following equation:

$$conf = -\sum_n p(h(n)) \times \log(p(h(n))),$$

wherein, the h(n) represents a histogram, and the p(•) represents a probability function. Those skilled in the art could understand that the above description of acquiring the target candidate region and the confidence level thereof is merely an example, and other existing or future possible description of acquiring the target candidate region and the confidence level thereof, which is applicable to the present disclosure, should also be covered within the scope of protection of the present disclosure and included herein by reference.

Figure 7:
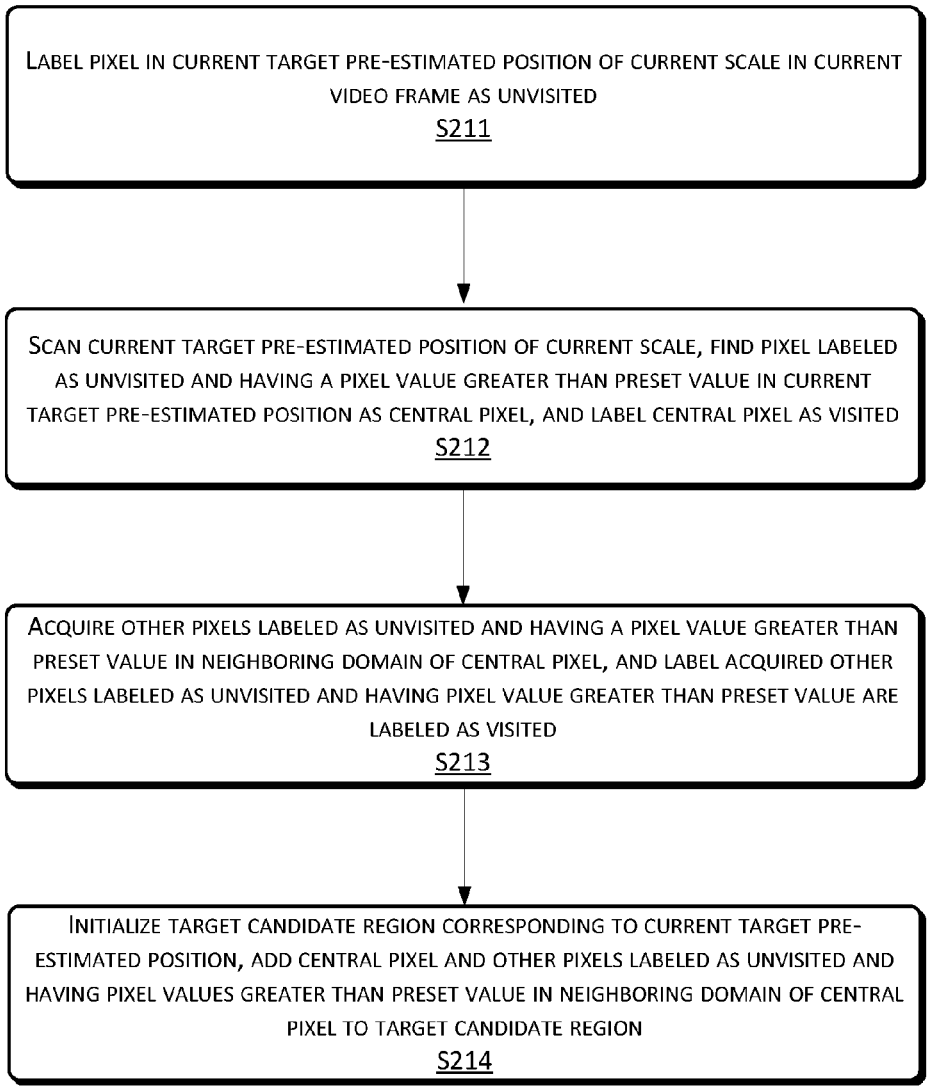
FIG. 7 is a flow chart of an example target acquisition method according to yet another more example embodiment of the present disclosure.

In the target acquisition method according to an example embodiment of the present disclosure, as shown in FIG. 7, the above S21 includes sequentially using each target pre-estimated position of each scale in each video frame as a current target pre-estimated position of a current scale in a current video frame, and sequentially performing the following processing on the current target pre-estimated position of the current scale in the current video frame:

At S211, the pixel in the current target pre-estimated position of a current scale in a current video frame is labeled as unvisited.

At S212, the current target pre-estimated position of the current scale is scanned, a pixel labeled as unvisited and having a pixel value (weight) greater than a preset value in the current target pre-estimated position is found as a central pixel, and the central pixel is labeled as visited. For example, the preset value may be at the position of 0.2 for labeling the central pixel flag=1.

At S213, other pixels labeled as unvisited and having a pixel value (weight) greater than a preset value in a neighboring domain of the central pixel are acquired, and the acquired other pixels labeled as unvisited and having a pixel value (weight) greater than a preset value are labeled as visited.

At S214, a target candidate region corresponding to the current target pre-estimated position is initialized; the central pixel and the other pixels labeled as unvisited and having a pixel value (weight) greater than a preset value in a neighboring domain of the central pixel are added to the target candidate region. For example, if the other pixels meet the p(x,y)>0.2 and flag=0, p(x,y) is a value corresponding to the (x,y) position of a significance map, the neighboring domain is an eight neighboring domain or a street neighboring domain (a four neighboring domain), wherein each target pre-estimated position should be corresponding to one target candidate region. Those skilled in the art could understand that the above description of acquiring the target candidate region is merely an example, and other existing or future possible description of acquiring the target candidate region, which is applicable to the present disclosure, should also be covered within the scope of protection of the present disclosure and included herein by reference.

Figure 8:
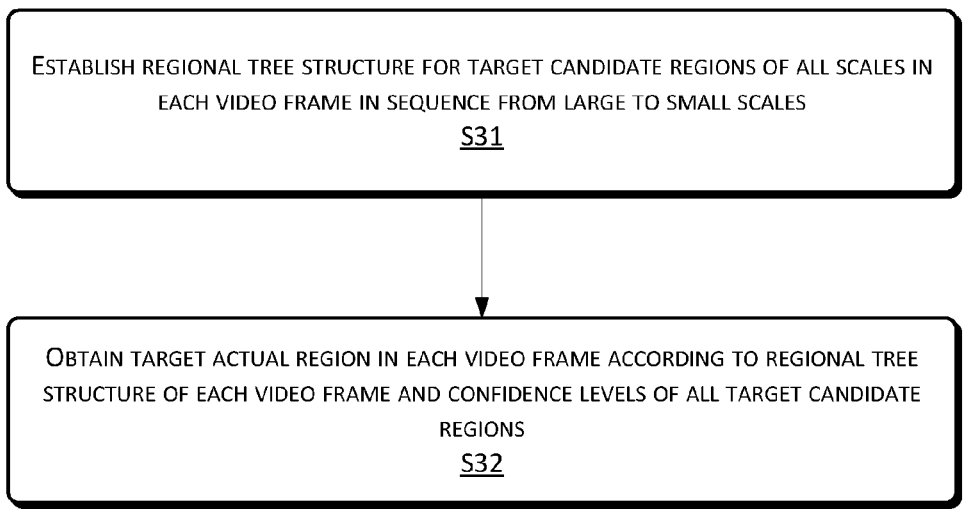
FIG. 8 is a flow chart of an example target acquisition method according to yet another example embodiment of the present disclosure.
Figure 9:
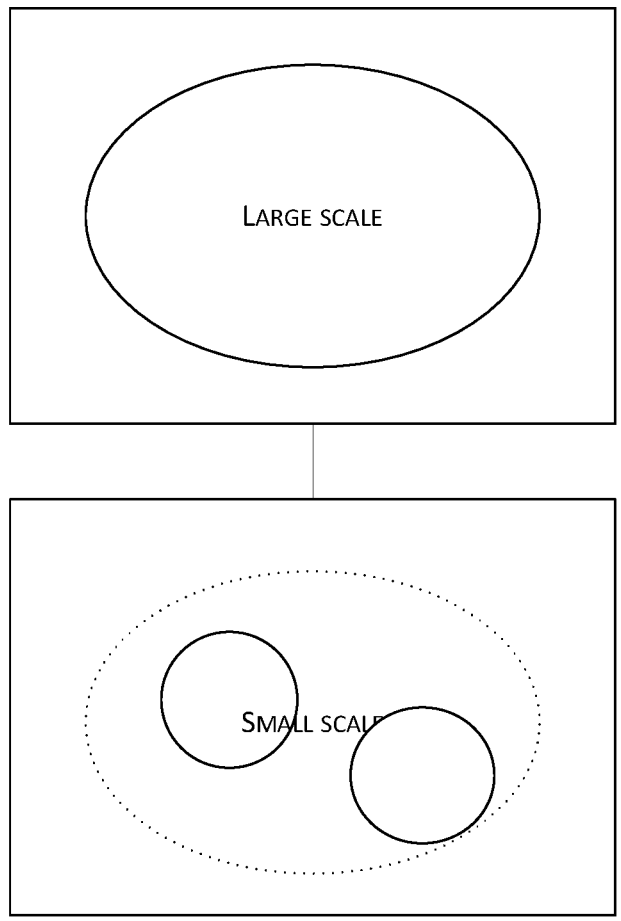
FIG. 9 is a view of an example multi-scale processed multi-child tree according to an example embodiment of the present disclosure.
Figure 10:
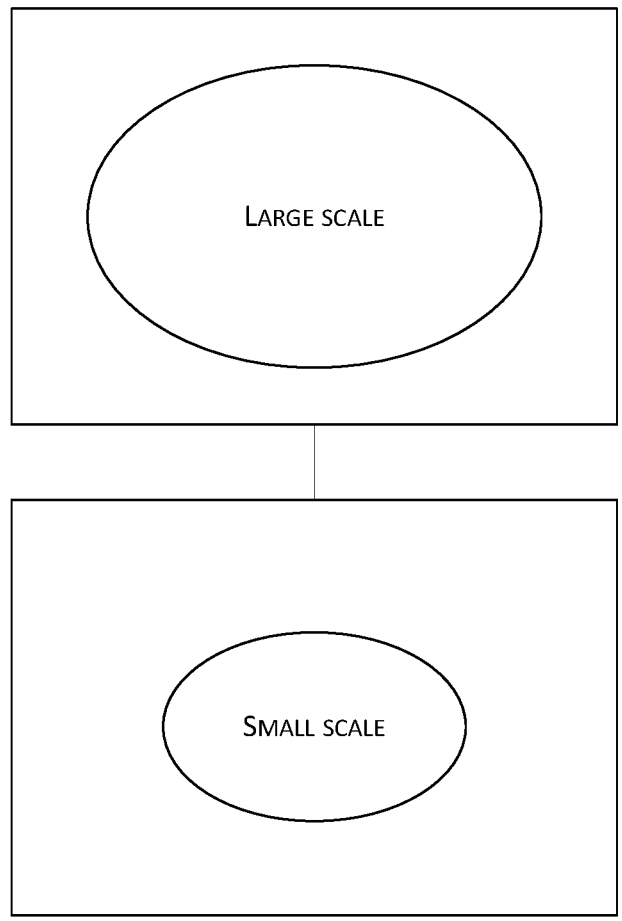
FIG. 10 is a view of an example multi-scale processed single-child tree according to an example embodiment of the present disclosure.

FIG. 8 is a flow chart of the target acquisition method according to an example embodiment of the present disclosure. With reference to FIG. 8, the operations of S3 in FIG. 1 include the following processing on each video frame:

At S31, a regional tree structure is established for the target candidate regions of all scales in each video frame in a sequence from large to small scales; if the target candidate region having the number of pixels less than a preset number is filtered out at S22, the target candidate region herein is the target candidate region that is not filtered out. For example, the operation of S132 uses a Gaussian low-pass filter having multiple scales such as 8 scales. Therefore, the target candidate region obtained in S23 is also composed of 8 scales, in which the regional tree structure is established in a sequence from large to small scales, and the structure including: a multi-child tree and a single-child tree respectively shown in FIGS. 9 and 10.

At S32, the target actual region in each video frame is obtained according to the regional tree structure of each video frame and the confidence levels of all the target candidate regions.

Figure 11:
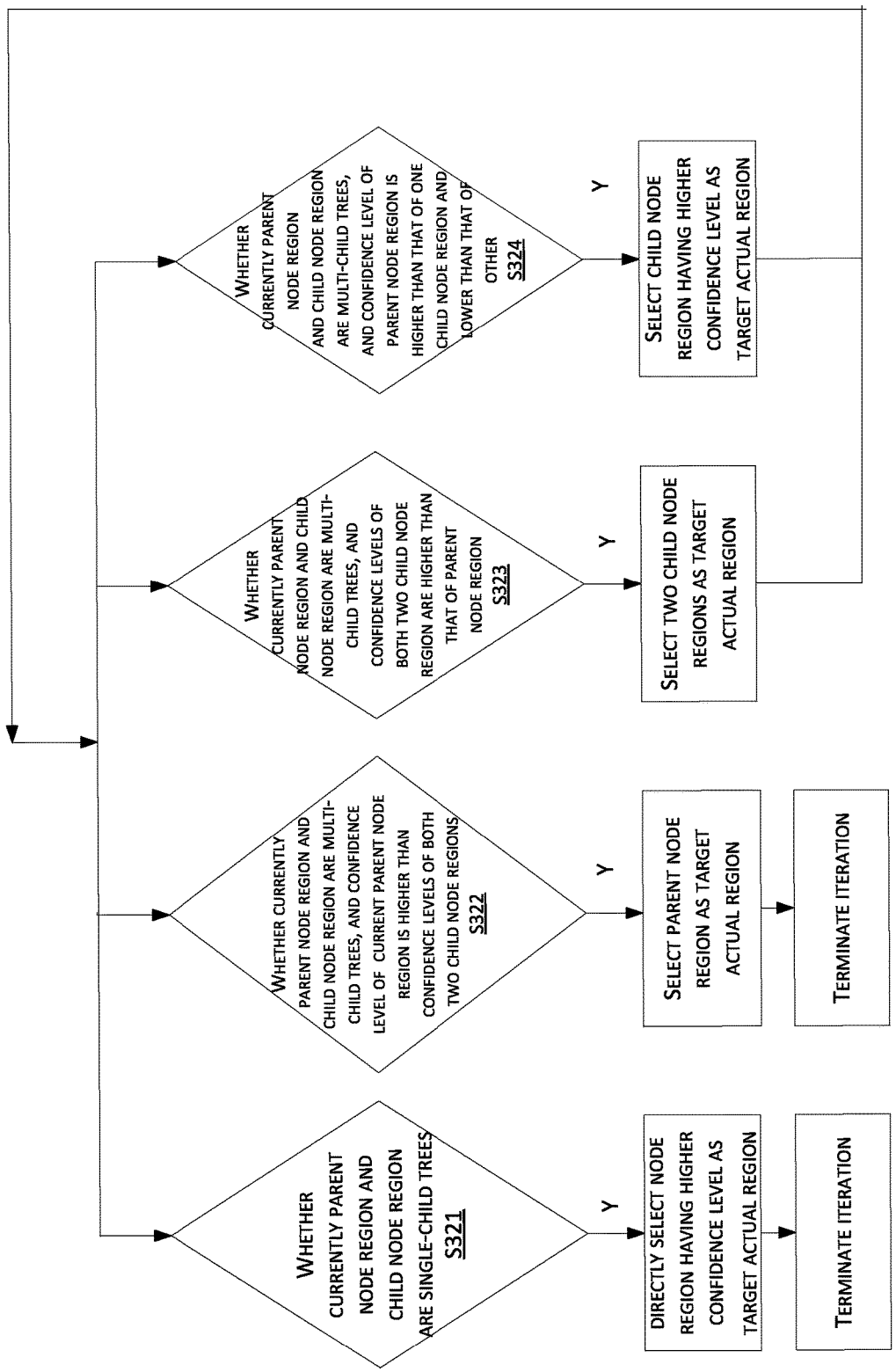
FIG. 11 is a flow chart of an example target acquisition method according to yet another example embodiment of the present disclosure.

In the target acquisition method according to an example embodiment of the present disclosure, as shown in FIG. 11, the operations of S32 include traversing each node region of the regional tree structure of each video frame in a sequence from large to small scales, and implementing iteration in accordance with the following situations to obtain the target actual region in each video frame:

At S321, if currently the parent node region and the child node region are single-child trees (a single-child tree case), the node region having a higher confidence level (conf) is directly selected as the target actual region and the iteration is terminated;

At S322, if currently the parent node region and the child node region are multi-child trees, and the confidence level of the current parent node region is higher than the confidence levels of both the two child node regions (a multi-child tree case 1), the parent node region is selected as the target actual region and the iteration is terminated;

At S323, if currently the parent node region and the child node region are multi-child trees, and the confidence levels of the current two child node region are both higher than the confidence level of the current parent node region (a multi-child tree case 2), the two child node regions are selected as the target actual region. During traversing the remaining child node region after this operation, it is further required to continue recursing the iteration to the node regions of lower scales in accordance with the multi-child tree case 2 and the multi-child tree case 3 to acquire an actual region until the single-child tree case or the multi-child tree case 1 occurs.

At S324, if currently the parent node region and the child node region are multi-child trees, and the confidence level of the parent node region is higher than the confidence level of one of the two child node regions and is lower than the confidence level of the other one of the two child node regions (a multi-child tree case 3), the child node region having the higher confidence level is selected as the target actual region. During traversing the remaining child node region after this step, it is further required to continue recursing the iteration to the node regions of lower scales in accordance with the multi-child tree case 2 and multi-child tree case 3 to acquire an actual region until the single-child tree case or the multi-child tree case 1 occurs. Those skilled in the art could understand that the above description of acquiring the target actual region is merely an example, and other existing or future possible description of acquiring the target actual region, which is applicable to the present disclosure, should also be covered within the scope of protection of the present disclosure and included herein by reference.

Figure 12:
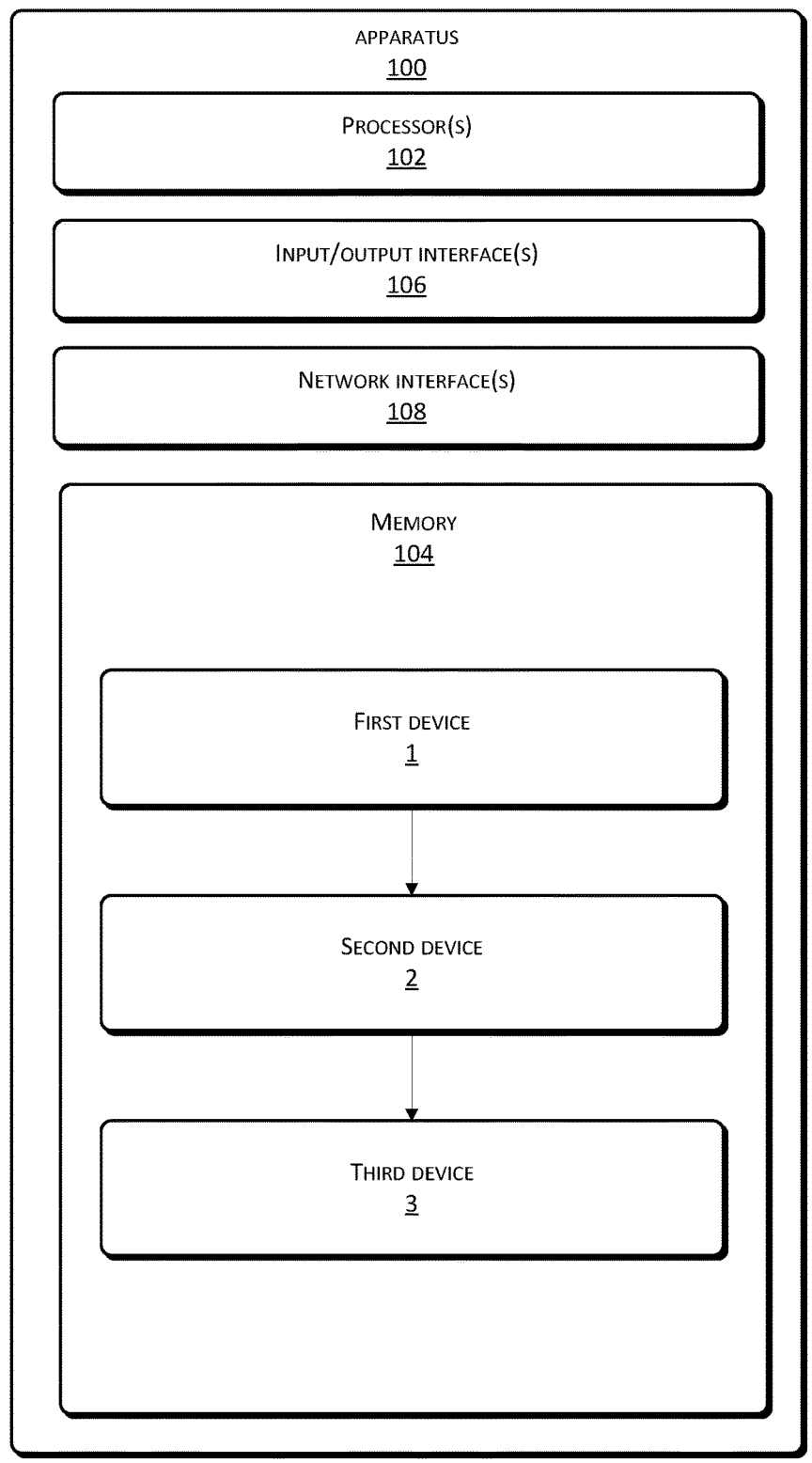
FIG. 12 is a schematic view of an example target acquisition apparatus according to another aspect of the present disclosure.

As shown in FIG. 12, another aspect of the present disclosure further provides a target acquisition apparatus 100, which includes one or more processor(s) 102 or data processing unit(s) and memory 104. The apparatus 100 may further include one or more input/output interface(s) 106, and network interface(s) 108. The memory 104 is an example of computer-readable media.

The memory 104 may store therein a plurality of modules or units including:

a first device 1 that obtains the target pre-estimated position of each scale in the video frame according to a global feature of each video frame. In order to realize automatically selecting a target, the method of a feature training model and a classifier cannot be used to implement the detection on the target. Different from the conventional multiple-target tracking method, the present disclosure uses detection of significance degree to implement the pre-estimation of the target position, in which each video frame is extracted from the same video, and the target pre-estimated position in the video frame is a significance map, for example, a probability map;

a second device 2 that clusters the target pre-estimated position in each video frame to obtain a corresponding target candidate region; and a third device 3 that determines a target actual region in the video frame according to all the target candidate regions in each video frame in combination with confidence levels of the target candidate regions and corresponding scale processing. Herein, one or more target actual regions may be obtained, which realizes quickly and effectively acquiring one or multiple targets, and in particular, accurately distinguishes and acquires the multiple targets.

Figure 13:
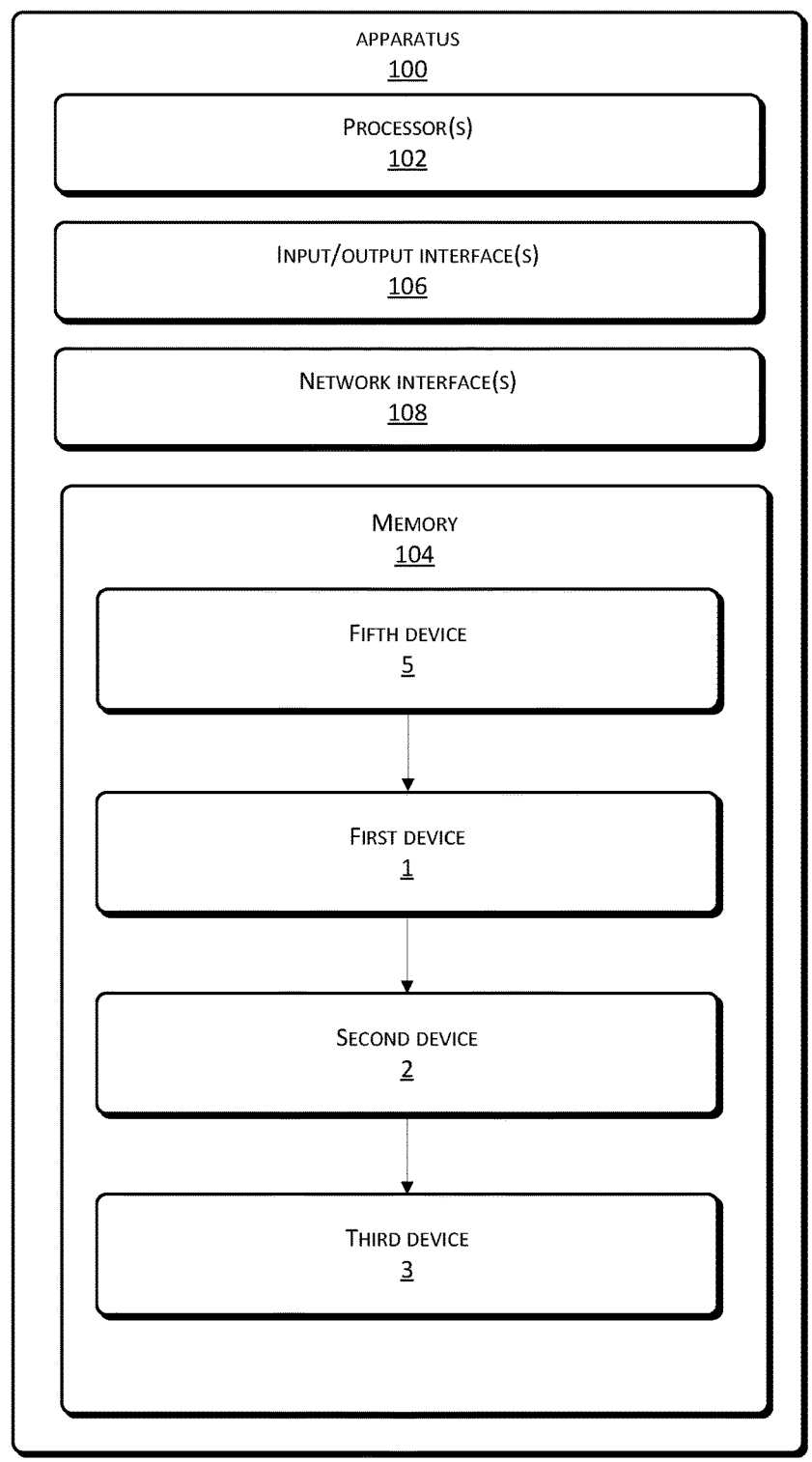
FIG. 13 is a schematic view of an example target acquisition apparatus according to an example embodiment of the present disclosure.

As shown in FIG. 13, in the target acquisition apparatus according to an example embodiment of the present disclosure, the apparatus 100 further includes:

a fifth device 5 that performs size normalization on each video frame. Herein, in the process of zooming in and out for each video frame, methods such as bilinear interpolation, linear interpolation, or cubic interpolation can be used for interpolating the missing pixel value, for example, each video frame can be all converted into 64×64 pixels. Correspondingly, in the first device 1, the global feature of each video frame is obtained according to the normalized video frame. Those skilled in the art could understand that the above description of performing the size normalization on the video frame is merely an example, and other existing or future possible normalization which is applicable to the present disclosure should also be covered within the scope of protection of the present disclosure and included herein by reference.

Figure 14:
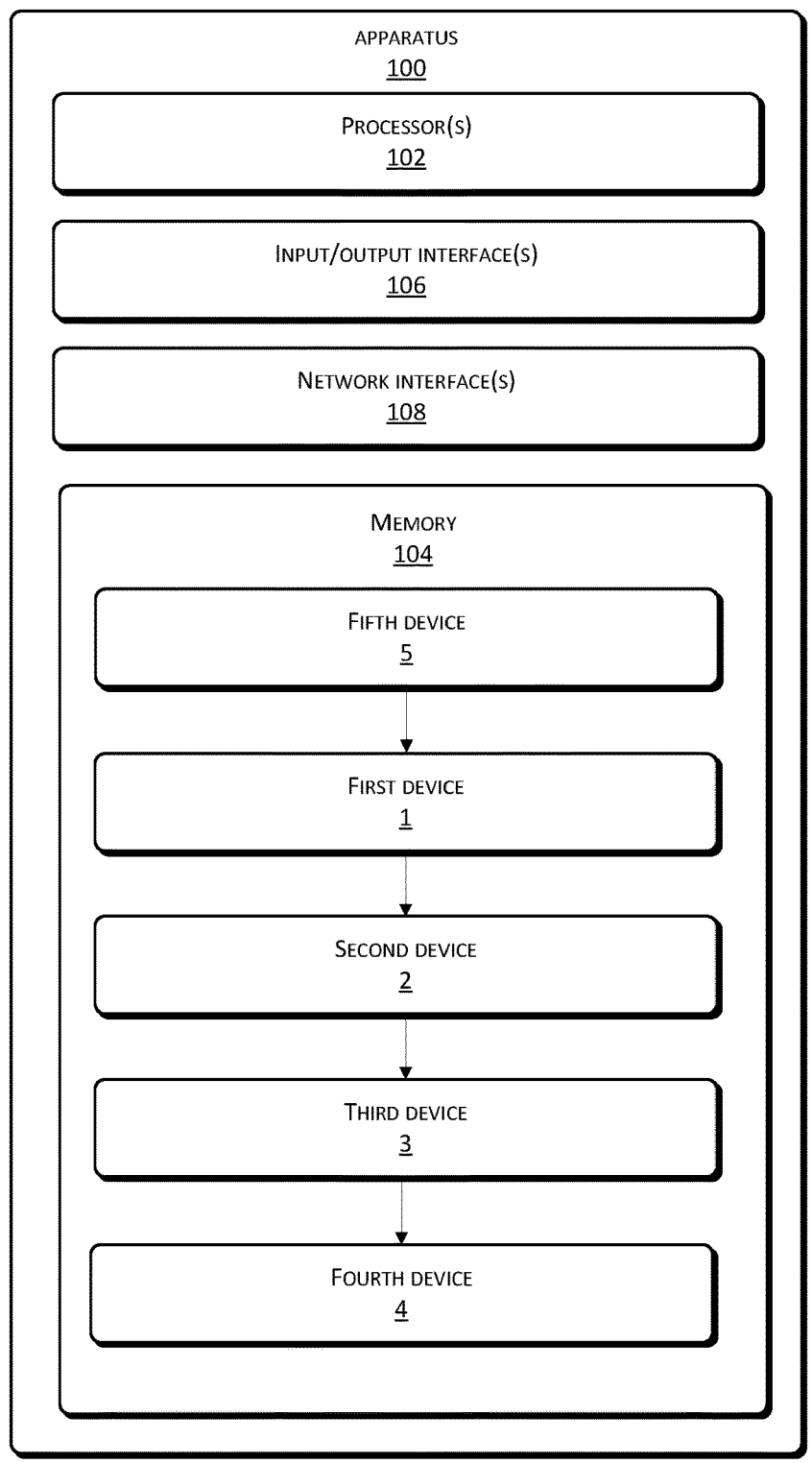
FIG. 14 is a schematic view of an example target acquisition apparatus according to yet another example embodiment of the present disclosure.

As shown in FIG. 14, in the target acquisition apparatus according to an example embodiment of the present disclosure, the apparatus 100 further includes:

a fourth device 4 that compares the same target actual regions in the video frames at two adjacent time points, to determine whether the target actual regions in the video frames are invalid. For example, whether the distance between the central positions of the same target actual regions in the video frames at two adjacent time points is greater than or equal to a preset threshold can be calculated, and if a result is yes, the fourth device 4 determines that the target actual region in the video frame at the latter one of the two adjacent time points is invalid. In addition, a slope from the target actual region at the time point t−1 to the same target actual region at the time point t, and a slope from the target actual region at the time point t to the target actual region at the time point t+1 can be further calculated, and whether the difference between the former and the latter slopes is higher than a preset threshold is determined, and if a result is yes, the fourth device 4 determines that they are not in the same track, i.e., the target actual region at the time point t+1 is invalid. Herein, whether the tracking process is valid is determined by using the motion continuity of the moving target, so as to determine whether the tracked target is occluded or leaves the scenario, which facilitates achieving a higher precision in the subsequent extracting of the targets in the video, and provides basic features for video classification. Those skilled in the art could understand that the above description of determining whether the target actual region is invalid is merely an example, and other existing or future possible description of determining that the target actual region is invalid, which is applicable to the present disclosure, should also be covered within the scope of protection of the present disclosure and included herein by reference.

In the target acquisition apparatus according to an example embodiment the present disclosure, the distance between the same target actual regions in the video frames at the two adjacent time points may be obtained by the fourth device 4 from the following equation:

$$|c_{region}(t,\text{region})-c_{region}(t+1,\text{region})|,$$

wherein, the region represents a certain target actual region, the function c represents a central location of the target actual region, |·| represents an Euclidean distance between the same target actual regions at adjacent time points, t and t+1 represent two adjacent time points, and if the Euclidean distance is greater than or equal to a given threshold, it is determined that the tracked target disappears or leaves field of view that the time point t+1. The threshold may be set correspondingly by the fifth device 5 according to the normalized pixel. In an example embodiment, if the fifth device 5 has entirely converted each video frame into 64×64 pixels, the corresponding given threshold value may be 4. Those skilled in the art could understand that the above description of calculating the distance between the same target actual regions is merely an example, and other existing or future possible description of calculating the distance between the same target actual regions, which is applicable to the present disclosure, should also be covered within the scope of protection of the present disclosure and included herein by reference.

In the target acquisition apparatus according to an example embodiment of the present disclosure, all the global features of each video frame include one or more of a global grayscale feature, a global texture feature, a global color feature, and a global motion feature.

In an example embodiment of the present disclosure, the global grayscale feature of each video frame is obtained based on an average value of a sum of three color channels of the video frame, and is specifically obtained from the following equation:

$$I=\tfrac{1}{3}(r+g+b),$$

wherein I represents the global grayscale feature of the video frame, r represents a red pixel channel of the video frame, g represents a green pixel channel of the video frame, and b represents a blue pixel channel of the video frame. Those skilled in the art could understand that the above description of acquiring the global grayscale feature is merely an example, and other existing or future possible description of acquiring the global grayscale feature, which is applicable to the present disclosure, should also be covered within the scope of protection of the present disclosure and included herein by reference.

In the target acquisition apparatus according to an example embodiment of the present disclosure, the global texture feature of each video frame is extracted by using an edge detection algorithm of Gabor matrix (filter) or Canny operator.

In the target acquisition apparatus according to an example embodiment the present disclosure, extracting the global texture feature of each video frame by using Gabor matrix (filter) includes:

using a maximum value based on position for the Gabor matrix $G_\theta$ generated in a preset number of directions of each video frame as the global texture feature O of each video frame, which may be described by using an equation as follows: $O=\max_{pixel}\{G_\theta\}$. For example, the Gabor matrix is a two-dimensional Gabor matrix G having a size of 11×11 pixels block, which is described as follows:

$$G_\theta(x,y) = \exp\left(-\frac{(X^2+\gamma^2 Y^2)}{2\sigma^2}\right)\cos\left(\frac{2\pi}{\lambda}X\right),$$

in the equation, the θ is the preset number of directions, θ={0°, 45°, 90°, 135°}, $G_\theta$ represents a two-dimensional Gabor matrix in a certain direction, X and Y represent a coordinate transformation after joining the direction (an angle parameter) θ, X=x cos θ−y sin θ, Y=x sin θ+y cos θ, x represents a row coordinate of the pixel in each video frame, y represents a column coordinate of the pixel in each video frame, x,y∈{−5, . . . ,5}, γ, and γ represent a scaling factor, σ represents an effective width, λ represents a wavelength, the values of three constants including the scaling factor, the effective width, and the wavelength are experience values. In one example embodiment, the value of the scaling factor γ is 0.3, the value of the effective width is 4.5, and the value of the wavelength λ is 5.6. If the θ has four directions of 0°, 45°, 90°, 135°, a maximum value is obtained based on position for the Gabor matrix $G_\theta$ generated in four directions of each video frame to obtain the global texture feature O of the video frame. Those skilled in the art could understand that the above description of acquiring the global texture feature is merely an example, and other existing or future possible description of acquiring the global texture feature, which is applicable to the present disclosure, should also be covered within the scope of protection of the present disclosure and included herein by reference.

In the target acquisition apparatus according to an example embodiment of the present disclosure, extracting the global color feature of each video frame includes:

obtaining modified basis matrices R, G, B, and Y of four colors including red, green, blue, and yellow according to three color channels of each video frame; wherein, the modified matrices R, G, B, and Y of four colors are established based on the sensitivity of the human eye for different colors, and the equation is specifically described as follows:

$$R = r - \frac{(g+b)}{2}$$

$$G = g - \frac{(r+b)}{2}$$

$$B = b - \frac{(r+g)}{2}$$

$$Y = \frac{(r+g)}{2} - \frac{|r-g|}{2} - b;$$

obtaining a red-green color feature matrix RG and a blue-yellow color feature matrix BY according to the basis matrices R, G, B, and Y of four colors including red, green, blue, and yellow, in which RG=R–G and BY=B–Y; and using an absolute value |RG–BY| a difference between the red-green color feature matrix and the blue-yellow color feature matrix as the global color feature of the video frame. Those skilled in the art could understand that the above description of acquiring the global color feature is merely an example, and other existing or future possible description of acquiring the global color feature, which is applicable to the present disclosure, should also be covered within the scope of protection of the present disclosure and included herein by reference.

In the target acquisition apparatus according to an example embodiment of the present disclosure, the extracting of the global motion feature of each video frame includes:

using an absolute value of a difference between the grayscale feature map of each video frame and the grayscale feature map of the video frame previous to the preset frame as the global motion feature of the video frame. Herein, the equation of the global motion feature M(t) of the video frame is described as follows:

$$M(t)=|I(t)-I(t-\tau)|,$$

wherein, M(t) represents the global motion feature of the video frame, the time point of the video frame is the time point t, I(t) represents the grayscale feature map of the video frame, I(t–τ) represents the grayscale feature map of the video frame previous to the preset τ frame, the time point of the video frame previous to the preset τ frame is t–τ, wherein, the τ is a motion frame change amount, I(t) represents the motion variation at the time point t after a change of τ frames, the value of the τ is determined according to the number of video frames per second in the video stream. The greater the number of the video frames per second is, the higher the value of τ is, the value of τ in one example embodiment may be from 1 to 5, and the value of τ in an example embodiment may be 3, I(t) and I(t–τ) are obtained according to the equation I=⅓(r+g+b)

wherein I represents the global grayscale feature of the video frame, r represents a red pixel channel of the video frame, g represents a green pixel channel of the video frame, and b represents a blue pixel channel of the video frame. Those skilled in the art could understand that the above description of acquiring the global motion feature is merely an example, and other existing or future possible description of acquiring the global motion feature, which is applicable to the present disclosure, should also be covered within the scope of protection of the present disclosure and included herein by reference.

In the target acquisition apparatus according to an example embodiment of the present disclosure, the first device 1 is that weight the global feature of each video frame and perform multi-scale frequency domain amplitude spectrum filtering, to obtain the target pre-estimated position of each scale in the video frame.

Figure 15:
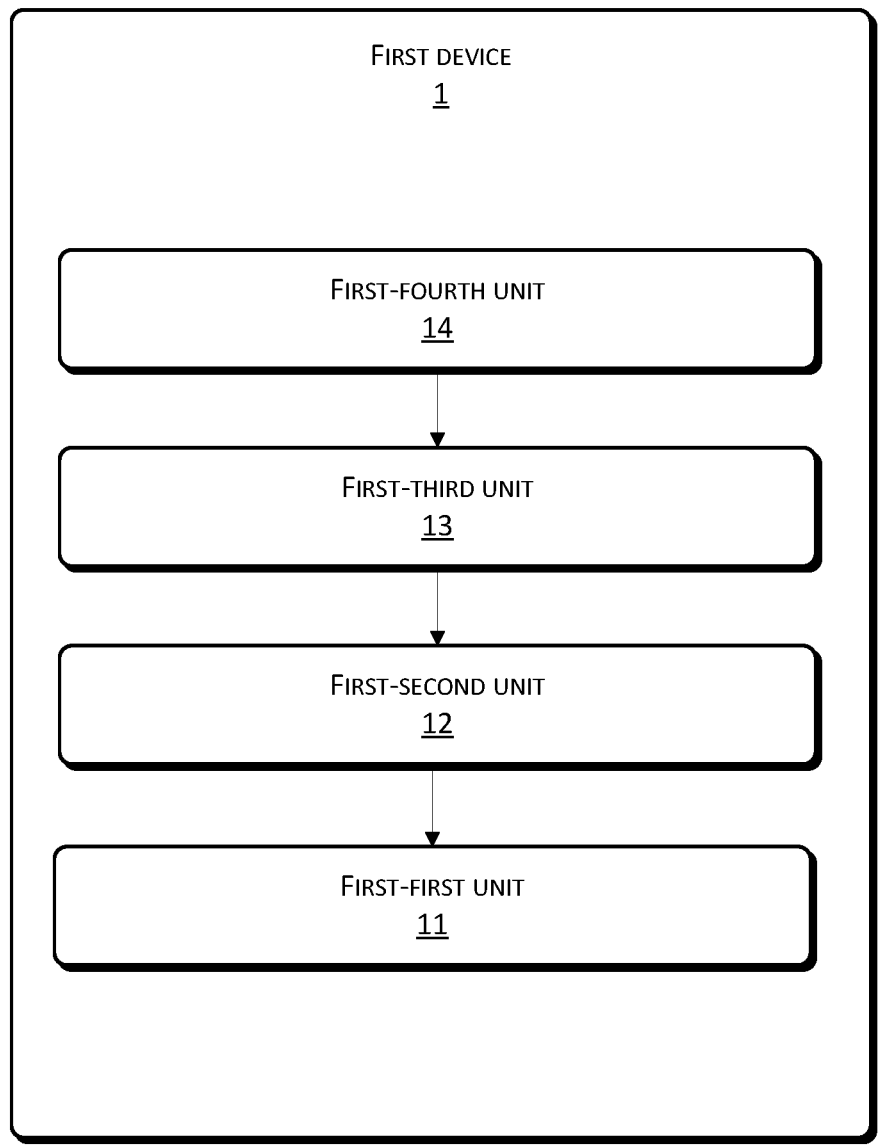
FIG. 15 is a schematic view of an example target acquisition apparatus according to yet another example embodiment of the present disclosure.

As shown in FIG. 15, in the target acquisition apparatus according to an example embodiment of the present disclosure, the first device 1 includes:

a first-first unit 11 that weights the global feature of each video frame to obtain a matrix polynomial; wherein, if the global grayscale feature, the global texture feature, the global color feature, and the global motion feature of each video frame are extracted, the matrix polynomial is specifically described as follows:

$$f(n,m)=|RG-BY|+I\vec{i}+O\vec{j}+M(t)\vec{k}$$

n,m respectively represent discrete row and column coordinates, and i, j, and k represent base vectors of the matrix polynomial;

a first-second unit 12 that performs a polynomial Fourier transformation on the matrix polynomial to obtain a frequency domain polynomial matrix; wherein, the frequency domain polynomial matrix is described as follows:

$$F[u,v] = \frac{1}{\sqrt{MN}} \sum_{m=0}^{M-1} \sum_{n=0}^{N-1} e^{-\mu 2\pi\left(\left(\frac{mv}{M}\right)+\left(\frac{nu}{N}\right)\right)} f(n,m),$$

in the equation, u and v represent two dimensional coordinates of the frequency domain, M and N represent length and width of the video frame, and μ represents an imaginary unit, namely μ²=1;

a first-third unit 13 that performs the multi-scale amplitude spectrum filtering on the frequency domain polynomial matrix to obtain the frequency domain of each scale; and a first-fourth unit 14 that performs an inverse Fourier transformation on the frequency domain of each scale to obtain the target pre-estimated position of each scale in the video frame. Herein, the target pre-estimated position f̃(n,m) is obtained based on the following equation:

$$\tilde{f}(n,m) = \frac{1}{\sqrt{MN}} \sum_{v=0}^{M-1} \sum_{u=0}^{N-1} e^{\mu 2\pi\left(\left(\frac{mv}{M}\right)+\left(\frac{nu}{N}\right)\right)} \tilde{F}_H[u,v].$$

Those skilled in the art could understand that the above description of acquiring the target pre-estimated position is merely an example, and other existing or future possible description of acquiring the target pre-estimated position, which is applicable to the present disclosure, should also be covered within the scope of protection of the present disclosure and included herein by reference.

Figure 16:
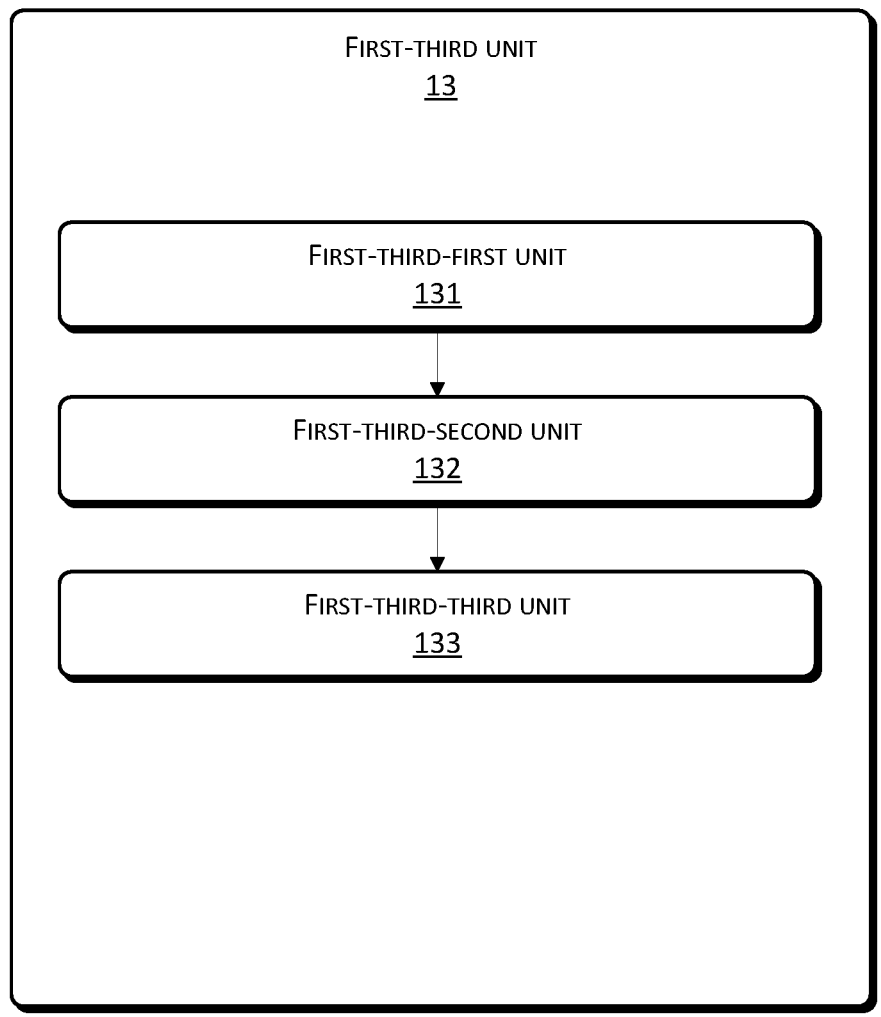
FIG. 16 is a schematic view of an example target acquisition apparatus according to yet another example embodiment of the present disclosure.

As shown in FIG. 16, in the target acquisition apparatus according to an example embodiment of the present disclosure, the first-third unit 13 includes:

a first-third-first unit 131 that obtains a corresponding amplitude spectrum A according to the frequency domain polynomial matrix; wherein, the amplitude spectrum of the frequency domain polynomial matrix is represented as follows:

$$A=|F|;$$

a first-third-second unit 132 that performs preset multi-scale amplitude spectrum filtering on the amplitude spectrum by using a Gaussian low-pass filter to obtain a filtered amplitude spectrum of each scale, and the Gaussian low-pass filter has the following form:

$$H(u, v) = e^{-\frac{D^2(u,v)}{2\sigma^2}},$$

in the equation, H is the Gaussian low-pass filter matrix, D represents a distance from the origin of the Fourier transformation, the distance may use an Euclidean distance, u indicates that an extension degree of a Gaussian curve, namely the scale, which is specifically described as follows: $\sigma \in \{2^{-1}, 2^0, 2^1, 2^2, 2^3, 2^4, 2^5, 2^6\}$; wherein, a plurality of scales is used to adapt to the acquisition of targets of different sizes;

the filtered amplitude spectrum of each scale is obtained according to the following equation:

$$A_H = A \times H$$

in the equation, $A_H$ represents the filtered amplitude spectrum of each scale.

a first-third-third unit 133 that obtains a filtered frequency domain of each scale according to a phase spectrum and the filtered amplitude spectrum of each scale, wherein the filtered frequency domain $\tilde{F}_H$ of each scale is represented as followings:

$$\tilde{F}_H = A_H \times P_H,$$

wherein, the $P_H$ represents the phase spectrum. Those skilled in the art could understand that the above description of acquiring the frequency domain is merely an example, and other existing or future possible description of acquiring the frequency domain, which is applicable to the present disclosure, should also be covered within the scope of protection of the present disclosure and included herein by reference.

Figure 17:
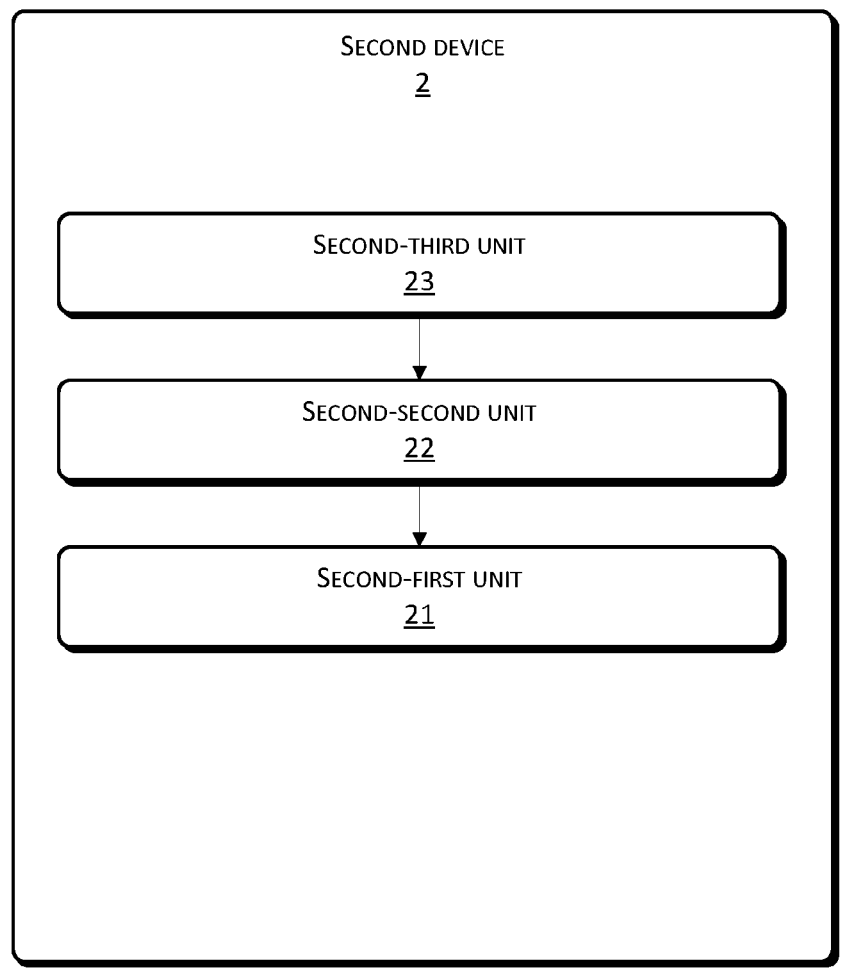
FIG. 17 is a schematic view of an example target acquisition apparatus according to yet another example embodiment of the present disclosure.

As shown in FIG. 17, in the target acquisition apparatus according to an example embodiment of the present disclosure, the second device 2 further includes:

a second-first unit 21 that obtains a corresponding target candidate region according to each target pre-estimated position of each scale in each video frame;

a second-second unit 22 that determines whether the number of pixels in each target candidate region is less than a preset number, and if a result is yes, filters out the target candidate region, such as filtering out the target candidate region having a number of pixels less than 10, and sets flag=0, i.e., no longer calculate the confidence level for the region subsequently;

a second-third unit 23 that makes a histogram, with respect to the target candidate region, for each target candidate region that is not filtered out, and calculates information entropy of each target candidate region by using the histogram as a confidence level of the corresponding target candidate region. Herein, the confidence level may be obtained according to the following equation:

$$conf = -\sum_n p(h(n)) \times \log(p(h(n))),$$

wherein, the h(n) represents a histogram, and the p(•) represents a probability function. Those skilled in the art could understand that the above description of acquiring the target candidate region and the confidence level thereof is merely an example, and other existing or future possible description of acquiring the target candidate region and the confidence level thereof, which is applicable to the present disclosure, should also be covered within the scope of protection of the present disclosure and included herein by reference.

In the target acquisition apparatus according to an example embodiment of the present disclosure, the second-first unit 21 sequentially uses each target pre-estimated position of each scale in each video frame as a current target pre-estimated position of a current scale in a current video frame, and sequentially performs the following processing on the current target pre-estimated position of the current scale in the current video frame:

labeling the pixel in the current target pre-estimated position of a current scale in a current video frame as unvisited;

scanning the current target pre-estimated position of the current scale, finding a pixel labeled as unvisited and having a pixel value (weight) greater than a preset value in the current target pre-estimated position as a central pixel, and labeling the central pixel as visited; for example, the preset value may be at the position of 0.2 for labeling the central pixel flag=1;

acquiring other pixels labeled as unvisited and having a pixel value greater than a preset value in a neighboring domain of the central pixel, and labeling the acquired other pixels labeled as unvisited and having a pixel value greater than a preset value as visited; and initializing a target candidate region corresponding to the current target pre-estimated position, and adding the central pixel and other pixels labeled as unvisited and having a pixel value greater than a preset value in the neighboring domain to the target candidate region. For example, if the other pixels meet p(x,y)>0.2 and flag=0, p(x,y) is a value corresponding to the (x,y) position of a significance map, and the neighboring domain is an eight neighboring domain or a street neighboring domain (a four neighboring domain), wherein each target pre-estimated position should be corresponding to one target candidate region. Those skilled in the art could understand that the above description of acquiring the target candidate region is merely an example, and other existing or future possible description of acquiring the target candidate region, which is applicable to the present disclosure, should also be covered within the scope of protection of the present disclosure and included herein by reference.

Figure 18:
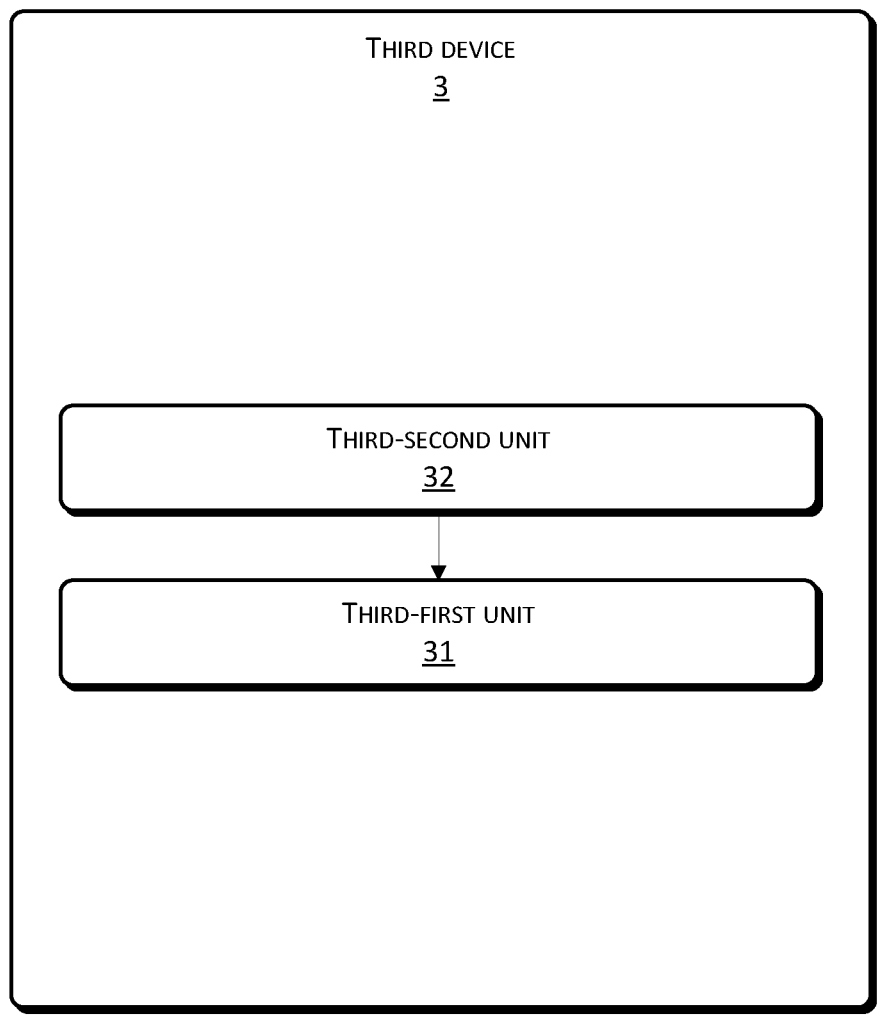
FIG. 18 is a schematic view of an example target acquisition apparatus according to yet another example embodiment of the present disclosure.

As shown in FIG. 18, in the target acquisition apparatus according to an example embodiment of the present disclosure, the third device 3 includes:

a third-first unit 31 that establishes a regional tree structure for the target candidate regions of all scales in each video frame in a sequence from large to small scales; wherein, if the second-first unit 21 filters out the target candidate region having the number of pixels less than a preset number, the target candidate region herein is the target candidate region that is not filtered out. For example, the first-third-second unit 132 uses a Gaussian low-pass filter having multiple scales such as 8 scales. Therefore, the target candidate region obtained in the second-third unit 23 is also composed of 8 scales, in which the regional tree structure is established in a sequence from large to small scales, and the structure is divided into two cases: a multi-child tree and a single-child tree respectively shown in FIGS. 9 and 10; and a third-second unit 32 that obtains the target actual region in each video frame according to the regional tree structure of each video frame and the confidence levels of all the target candidate regions.

In the target acquisition apparatus according to an example embodiment of the present disclosure, the third-second unit 32 traverses each node region of the regional tree structure of each video frame in a sequence from large to small scales, and implements iteration in accordance with the following situations to obtain the target actual region in each video frame:

if currently the parent node region and the child node region are single-child trees (a single-child tree case), the node region having a higher confidence level (conf) is directly selected as the target actual region and the iteration is terminated;

if currently the parent node region and the child node region are multi-child trees, and the confidence level of the current parent node region is higher than the confidence levels of both the two child node regions (a multi-child tree case 1), the parent node region is selected as the target actual region and the iteration is terminated;

if currently the parent node region and the child node region are multi-child trees, and the confidence levels of the current two child node region are both higher than the confidence levels of the current parent node region (a multi-child tree case 2), the two child node regions are selected as the target actual region; wherein, during subsequently traversing the remaining child node region, it is further required to continue recursing the iteration to the node regions of lower scales in accordance with the multi-child tree case 2 and multi-child tree case 3 to acquire an actual region until the single-child tree case or the multi-child tree case 1 occurs.

if currently the parent node region and the child node region are multi-child trees, and the confidence level of the parent node region is higher than the confidence level of one of the two child node regions and is lower than the confidence level of the other one of the two child node regions (a multi-child tree case 3), the child node region having the higher confidence level is selected as the target actual region. Herein, during subsequently traversing the remaining child node region, it is further required to continue recursing the iteration to the node regions of lower scales in accordance with the multi-child tree case 2 and multi-child tree case 3 to acquire an actual region until the single-child tree case or the multi-child tree case 1 occurs. Those skilled in the art could understand that the above description of acquiring the target actual region is merely an example, and other existing or future possible description of acquiring the target actual region, which is applicable to the present disclosure, should also be covered within the scope of protection of the present disclosure and included herein by reference.

The present disclosure may be implemented by using matlab, C++ invoking OpenCV, and other manners.

The target acquisition method and apparatus of the present disclosure are further illustrated hereinafter with reference to the specific application embodiments.

In a specific application embodiment, in order to acquire multiple targets from a video, a plurality of video frames are extracted from the same video, the size normalization is performed on each video frame, and then the normalized global feature of each video frame is extracted. The global feature includes a global grayscale feature, a global texture feature, a global color feature, and global motion feature. Thereafter, the target pre-estimated position of each scale in the video frame is obtained according to the global feature of each video frame, then the target pre-estimated position in each video frame is clustered to obtain a corresponding target candidate region, and then the target pre-estimated position in each video frame is clustered to obtain a corresponding target candidate region, so as to quickly and effectively acquire one or multiple targets in each video frame, and solve the problem of relying on the types of the scenarios and targets in the conventional techniques. For example, the existing background modeling method for a Gaussian Mixture Model cannot be used in a traveling record video. In addition, whether the distance between the central positions of the same target actual regions in the video frames at two adjacent time points is greater than or equal to a preset threshold is also calculated subsequently, and if a result is yes, it is determined that the target actual region in the video frame at the latter one of the two adjacent time points is invalid, which facilitates more accurately and only extracting the effective target actual region in the video subsequently, and provides basic features for video classification or the like. For example, subsequently, the surveillance video of an automatic teller machine of a bank is distinguished from the video surveillance of a railway station based on the number of targets in the video, and the traveling record video is distinguished from the surveillance video of a bank based on the trajectory of the motion of the target.

In view of the above, the present disclosure obtains, according to a global feature of each video frame, a target pre-estimated position of each scale in the video frame; clusters the target pre-estimated position in each video frame to obtain a corresponding target candidate region, determines a target actual region in the video frame according to all the target candidate regions in each video frame in combination with confidence levels of the target candidate regions and corresponding scale processing, thereby quickly and effectively acquiring one or multiple targets, and in particular, being capable of accurately distinguishing and acquiring the multiple targets.

Further, the present disclosure calculates whether the distance between the central positions of the same target actual regions in the video frames at two adjacent time points is greater than or equal to a preset threshold, and if a result is yes, determines that the target actual region in the video frame at the latter one of the two adjacent time points is invalid, which achieves a higher precision in the subsequent extracting of the targets in the video, and provides basic features for video classification and the like.

Apparently, those skilled in the art may make many variations and changes on the present disclosure without departing from the spirit of the present disclosure. If these modifications and changes on the present disclosure fall within the scope of the claims of the present disclosure and the equivalent techniques thereof, the present disclosure also intends to cover these variations and changes.

It should be noted that, the present disclosure may be implemented in hardware, software and/or a combination of hardware and software, which, for example, may be implemented by using an Application Specific Integrated Circuit (ASIC), a general purpose computer, or any other similar hardware devices. In one example embodiment, the software program of the present disclosure may be executed through a processor to implement the above-mentioned steps or functions. Similarly, the software programs (including associated data structures) in the present disclosure may be stored in computer readable medium, for example, a RAM memory, a magnetic or optical drive, or a floppy disk, and similar devices. In addition, some steps or functions of the present disclosure can be implemented by using hardware, for example, a circuit cooperating with a processor to execute each step or function.

In addition, a part of the present disclosure may be implemented as computer program products, for example computer-executable instructions, and when they are executed by a computer, the method and/or technical solution of the present disclosure is invoked or provided through the operations of the computer. The computer-executable instructions for invoking the method of the present disclosure may be stored in a fixed or removable recording medium, and/or be transmitted via the data stream in a broadcast or other signal carrying media, and/or stored in a working storage of a computer device operated according to the program instructions. Herein, according to one example embodiment of the present disclosure, an apparatus includes computer readable storage for storing the computer-executable instructions and a processor for executing the computer-executable instructions. When the computer-executable instructions are executed by the processor, the apparatus is triggered to operate the method and/or technical solution based on the above-mentioned multiple embodiments according to the present disclosure.

For those skilled in this field, it is apparent that the present disclosure is not limited to the details of the above exemplary embodiments, and the present disclosure may be implemented in other specific forms without departing from the spirit or the basic features of the present disclosure. Therefore, no matter from which point of view, the embodiments should be considered as exemplary and the scope of the present disclosure is defined by the accompanying claims instead of by the above description, which aims at covering all the variations falling within the meaning and scope of the equivalent elements of the claims to fall within the present disclosure. Any reference numerals in the claims should not be regarded as limiting the claims involved. In addition, it is clear that the term "include" does not exclude other units or operations, and the singular does not exclude the plural. The multiple units or devices stated in the apparatus claim may also be implemented by one unit or device through software or hardware. The terms such as first and second are used to represent names, instead of any specific sequence.

What is claimed is:

1. A target acquisition method comprising:
performing size normalization on each video frame of a plurality of video frames;
obtaining target pre-estimated positions of multiple scales in each normalized video frame of the plurality of video frames according to a global feature of each normalized video frame;
clustering the target pre-estimated positions in each normalized video frame to obtain one or more target candidate regions; and
determining a target actual region in each normalized video frame according to the one or more target candidate regions in each normalized video frame in combination with confidence levels of the one or more target candidate regions and corresponding scale processing, including:
establishing a regional tree structure for the one or more target candidate regions of all scales in each normalized video frame in a sequence from large to small scales, and
obtaining the target actual region in each normalized video frame according to the regional tree structure of each normalized video frame and the confidence levels of the one or more target candidate regions, the obtaining the target actual region includes:
traversing each node region of the regional tree structure of each normalized video frame in a sequence from large to small scales, and
implementing an iteration to obtain the target actual region in each normalized video frame.

2. The method of claim 1, further comprising:
after determining the target actual region in each normalized video frame according to the one or more target candidate regions in each normalized video frame in combination with confidence levels of the one or more target candidate regions and corresponding scale processing,
comparing the same target actual regions in two video frames at two adjacent time points of the plurality of video frames to determine whether the target actual region is invalid.

3. The method of claim 1, wherein the global feature includes one or more of following features including:
a global grayscale feature;
a global texture feature;
a global color feature; and
a global motion feature.

4. The method of claim 3, wherein the global texture feature of each normalized video frame is extracted by using an edge detection algorithm of Gabor matrix or Canny operator.

5. The method of claim 3, further comprising extracting the global color feature of each normalized video frame, the extracting including:
obtaining modified basis matrices of four colors including red, green, blue, and yellow according to three color channels of each normalized video frame;
obtaining a red-green color feature matrix and a blue-yellow color feature matrix according to the basis matrices of the four colors; and
using an absolute value of a difference between the red-green color feature matrix and the blue-yellow color feature matrix as the global color feature of each normalized video frame.

6. The method of claim 3, further comprising extracting the global motion feature of each normalized video frame, the extracting including using an absolute value of a difference between a grayscale feature map of a respective video frame and a grayscale feature map of a corresponding previous video frame as the global motion feature of the video frame.

7. The method of claim 1, wherein the obtaining target pre-estimated positions of multiple scales in each normalized video frame of the plurality of video frames according to the global feature of each normalized video frame includes:
weighting the global feature of each normalized video frame and performing multi-scale frequency domain amplitude spectrum filtering to obtain the target pre-estimated position of each scale in each normalized video frame.

8. The method of claim 7, wherein the weighting the global feature of each normalized video frame and performing multi-scale frequency domain amplitude spectrum filtering to obtain the target pre-estimated position of each scale in each normalized video frame includes:
weighting the global feature of each normalized video frame to obtain a matrix polynomial;
performing a polynomial Fourier transformation on the matrix polynomial to obtain a frequency domain polynomial matrix;
performing a multi-scale amplitude spectrum filtering on the frequency domain polynomial matrix to obtain a frequency domain of each scale; and
performing an inverse Fourier transformation on the frequency domain of each scale to obtain the target pre-estimated position of each scale in each normalized video frame.

9. The method of claim 8, wherein the performing the multi-scale amplitude spectrum filtering on the frequency domain polynomial matrix to obtain the frequency domain of each scale includes:
obtaining a corresponding amplitude spectrum according to the frequency domain polynomial matrix;
performing a preset multi-scale amplitude spectrum filtering on the amplitude spectrum by using a Gaussian low-pass filter to obtain a filtered amplitude spectrum of each scale; and
obtaining a filtered frequency domain of each scale according to a phase spectrum and the filtered amplitude spectrum of each scale.

10. The method of claim 1, wherein the clustering the target pre-estimated positions in each normalized video frame to obtain the one or more target candidate regions includes:
obtaining a corresponding target candidate region according to each target pre-estimated position of each scale in each normalized video frame;
determining that a number of pixels in a respective target candidate region is less than a preset number;
filtering the respective target candidate region out;
making a histogram for each target candidate region that is not filtered out; and
calculating information entropy of each target candidate region that is not filtered out by using the histogram as a confidence level of the corresponding target candidate region.

11. The method of claim 10, wherein the obtaining the corresponding target candidate region according to each target pre-estimated position of each scale in each normalized video frame includes:
sequentially using each target pre-estimated position of each scale in each normalized video frame as a current target pre-estimated position of a current scale in a current video frame; and
sequentially performing following processing on the current target pre-estimated position of the current scale in the current video frame, the sequentially performing including:
labeling a pixel in the current target pre-estimated position of a current scale in a current video frame as unvisited;
scanning the current target pre-estimated position of the current scale;
finding a pixel labeled as unvisited and having a pixel value greater than a preset value in the current target pre-estimated position as a central pixel;
labeling the central pixel as visited;
acquiring other pixels labeled as unvisited and having a pixel value greater than the preset value in a neighboring domain of the central pixel;
labeling the acquired other pixels labeled as unvisited and having a pixel value greater than a preset value as visited;
initializing a target candidate region corresponding to the current target pre-estimated position; and
adding the central pixel and other pixels labeled as unvisited and having a pixel value greater than the preset value in the neighboring domain to the target candidate region.

12. The method of claim 1, wherein the implementing the iteration to obtain the target actual region in each normalized video frame includes:
determining that a parent node region and a child node region are single-child trees;
selecting the node region having a higher confidence level as the target actual region; and
terminating the iteration.

13. The method of claim 1, wherein the implementing the iteration to obtain the target actual region in each normalized video frame includes:
determining that a parent node region and two child node regions are multi-child trees, and a confidence level of the parent node region is higher than confidence levels of both the two child node regions;
selecting the parent node region as the target actual region; and
terminating the iteration.

14. The method of claim 1, wherein the implementing the iteration to obtain the target actual region in each normalized video frame includes:
determining that a parent node region and two child node regions are multi-child trees, and a confidence levels of the two child node regions are both higher than a confidence level of the parent node region; and
selecting the two child node regions as the target actual regions.

15. The method of claim 1, wherein the implementing the iteration to obtain the target actual region in each normalized video frame includes:
determining that a parent node region and two child node regions are multi-child trees, and a confidence level of the parent node region is higher than a confidence level of one of the two child node regions and is lower than a confidence level of the other one of the two child node regions; and
selecting the child node region having the higher confidence level as the target actual region.

16. A target acquisition apparatus comprising:
one or more processors; and
memory communicatively coupled to the one or more processors, the memory storing a plurality of modules executable by the one or more processors, that when executed by the one or more processors, cause the plurality of devices to perform associated operations, the plurality of devices comprising:
a normalization module configured to perform size normalization on each video frame of a plurality of video frames;
a target pre-estimated position obtaining module configured to obtain target pre-estimated positions of multiple scales in each normalized video frame of the plurality of video frames according to a global feature of each normalized video frame;

a clustering module configured to cluster the target pre-estimated positions in each normalized video frame to obtain one or more target candidate regions; and a determination module configured to determine a target actual region in each normalized video frame according to the one or more target candidate regions in each normalized video frame in combination with confidence levels of the one or more target candidate regions and corresponding scale processing, the determination module including:
- a regional tree structure module configured to establish a regional tree structure for the one or more target candidate regions of all scales in each normalized video frame in a sequence from large to small scales, and
- a target obtaining module configured to obtain the target actual region in each normalized video frame according to the regional tree structure of each normalized video frame and the confidence levels of the one or more target candidate regions by traversing each node region of the regional tree structure of each normalized video frame in a sequence from large to small scales and implementing an iteration to obtain the target actual region in each normalized video frame.

17. One or more memories stored thereon computer-executable instructions, executable by one or more processors, to cause the one or more processors to perform acts comprising:

performing size normalization on each video frame of a plurality of video frames;

obtaining target pre-estimated positions of multiple scales in each normalized video frame of the plurality of video frames according to a global feature of each normalized video frame;

clustering the target pre-estimated positions in each normalized video frame to obtain one or more target candidate regions; and determining a target actual region in each normalized video frame according to the one or more target candidate regions in each normalized video frame in combination with confidence levels of the one or more target candidate regions and corresponding scale processing, including:
- establishing a regional tree structure for the one or more target candidate regions of all scales in each normalized video frame in a sequence from large to small scales, and
- obtaining the target actual region in each normalized video frame according to the regional tree structure of each normalized video frame and the confidence levels of the one or more target candidate regions, the obtaining the target actual region includes:
  - traversing each node region of the regional tree structure of each normalized video frame in a sequence from large to small scales, and
  - implementing an iteration to obtain the target actual region in each normalized video frame.

18. The method of claim 1, wherein performing the size normalization includes interpolating a missing pixel value utilizing at least one of:
bilinear interpolation,
linear interpolation, or
cubic interpolation.

* * * * *

UNITED STATES PATENT AND TRADEMARK OFFICE
CERTIFICATE OF CORRECTION

PATENT NO. : 9,990,546 B2  
APPLICATION NO. : 15/015072  
DATED : June 5, 2018  
INVENTOR(S) : Xuan Jin Page 1 of 1

It is certified that error appears in the above-identified patent and that said Letters Patent is hereby corrected as shown below:

In the Claims

Column 28, Line 61, Claim 16, delete "devices" and insert --modules--

Column 28, Line 62, Claim 16, delete "devices" and insert --modules--

Signed and Sealed this  
Seventeenth Day of July, 2018

Andrei Iancu  
*Director of the United States Patent and Trademark Office*